United States Patent
Vance et al.

(10) Patent No.: US 10,972,597 B2
(45) Date of Patent: *Apr. 6, 2021

(54) MANAGING EXECUTABLE COMPONENT GROUPS FROM SUBSET OF USER EXECUTABLE COMPONENTS

(71) Applicant: T-Mobile USA, Inc., Bellevue, WA (US)

(72) Inventors: Michael Steffen Vance, Kenmore, WA (US); Jared T. Benson, Pleasant Hill, CA (US); Christian Robertson, Concord, CA (US); Shilpa R. Shah, Oakland, CA (US); Gabriel J. White, San Francisco, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,734

(22) Filed: Jun. 23, 2020

(65) Prior Publication Data

US 2020/0322472 A1 Oct. 8, 2020

Related U.S. Application Data

(63) Continuation of application No. 16/009,823, filed on Jun. 15, 2018, now Pat. No. 10,771,605, which is a (Continued)

(51) Int. Cl.
*G06F 3/0482* (2013.01)
*H04M 1/27457* (2020.01)
(Continued)

(52) U.S. Cl.
CPC ...... *H04M 1/27457* (2020.01); *G06F 3/0482* (2013.01); *G06F 3/04842* (2013.01);
(Continued)

(58) Field of Classification Search
CPC . G06F 3/0482; G06F 3/04842; G06F 3/04845
See application file for complete search history.

(56) References Cited

U.S. PATENT DOCUMENTS

| 4,723,209 | A | 2/1988 | Hernandez et al. |
| D296,218 | S | 6/1988 | Wells-Papanek et al. |

(Continued)

FOREIGN PATENT DOCUMENTS

| DE | 10155431 A1 | 6/2003 |
| EP | 0767418 A1 | 4/1997 |

(Continued)

OTHER PUBLICATIONS

Alltel Corp at Lehman Brothers Worldwide Wireless, Wirelein, and Media Conference, Fair Disclosure Wire, May 22, 2006.
(Continued)

*Primary Examiner* — David E Choi
(74) *Attorney, Agent, or Firm* — Knobbe, Martens, Olson & Bear, LLP

(57) ABSTRACT

Systems, methods, and computer-readable mediums for managing a subset of user contacts on a telecommunications device are provided. In one embodiment, a software application executed by a processor of a telecommunications device determines at least two contact groups from a subset of contacts accessible by a telecommunications device. The software application executed by the processor of the telecommunications device also generates a contact display including a representation of at least a portion of the first or second contact groups and a divider display object. The divider display object partitions the first contact group from the second contact group and is positioned adjacent to at least one contact from the first or second contact groups presented in the contact display.

24 Claims, 11 Drawing Sheets

Related U.S. Application Data continuation of application No. 14/961,798, filed on Dec. 7, 2015, now Pat. No. 10,021,231, which is a continuation of application No. 12/413,390, filed on Mar. 27, 2009, now Pat. No. 9,210,247.

(51) Int. Cl.
  *G06Q 10/10* (2012.01)
  *H04M 1/27453* (2020.01)
  *H04M 1/27475* (2020.01)
  *G06F 3/0484* (2013.01)
  *G06F 3/0488* (2013.01)

(52) U.S. Cl.
  CPC ...... *G06F 3/04845* (2013.01); *G06F 3/04883* (2013.01); *G06F 3/04886* (2013.01); *G06Q 10/107* (2013.01); *H04M 1/27453* (2020.01); *H04M 1/27475* (2020.01); *H04M 2250/22* (2013.01)

(56) References Cited

U.S. PATENT DOCUMENTS

| | | | |
|---|---|---|---|
| 5,590,256 A * | 12/1996 | Tchao | G06F 3/0485 715/234 |
| 5,617,539 A | 4/1997 | Ludwig et al. | |
| D384,052 S | 9/1997 | Kodosky | |
| D388,424 S | 12/1997 | DeMuro et al. | |
| D391,948 S | 3/1998 | Eisenberg | |
| 5,724,531 A | 3/1998 | Miyashita et al. | |
| 5,751,980 A | 5/1998 | Musashi et al. | |
| D395,427 S | 6/1998 | Arora et al. | |
| 5,793,365 A | 8/1998 | Tang et al. | |
| 5,796,394 A | 8/1998 | Wicks et al. | |
| D397,687 S | 9/1998 | Arora et al. | |
| D398,595 S | 9/1998 | Baer et al. | |
| 5,822,123 A | 10/1998 | Davis et al. | |
| 5,867,226 A | 2/1999 | Wehmeyer et al. | |
| 5,880,733 A | 3/1999 | Horvitz et al. | |
| 5,889,517 A | 3/1999 | Ueda et al. | |
| D415,483 S | 10/1999 | Decker | |
| 5,987,107 A | 11/1999 | Brown | |
| 5,987,469 A * | 11/1999 | Lewis | G06F 16/168 |
| 6,006,200 A | 12/1999 | Boies et al. | |
| 6,023,275 A | 2/2000 | Horvitz et al. | |
| 6,047,233 A * | 4/2000 | Salvatore, Jr. | G01S 7/22 701/120 |
| D424,036 S | 5/2000 | Arora et al. | |
| D424,541 S | 5/2000 | Mugura | |
| 6,104,398 A * | 8/2000 | Cox, Jr. | G06F 3/04847 715/821 |
| 6,130,726 A | 10/2000 | Darbee et al. | |
| 6,144,863 A | 11/2000 | Charron | |
| 6,151,059 A | 11/2000 | Schein et al. | |
| D437,858 S | 2/2001 | Yasui et al. | |
| 6,188,406 B1 | 2/2001 | Fong et al. | |
| D438,873 S | 3/2001 | Wang et al. | |
| 6,201,957 B1 | 3/2001 | Son et al. | |
| D440,979 S | 4/2001 | Wang et al. | |
| 6,222,921 B1 | 4/2001 | Mugura et al. | |
| 6,226,367 B1 | 5/2001 | Smith et al. | |
| 6,236,398 B1 | 5/2001 | Kojima et al. | |
| 6,249,863 B1 | 6/2001 | Redford et al. | |
| D445,426 S | 7/2001 | Wang et al. | |
| D446,790 S | 8/2001 | Wang et al. | |
| 6,313,877 B1 | 11/2001 | Anderson | |
| 6,332,024 B1 | 12/2001 | Inoue et al. | |
| D454,138 S | 3/2002 | Imamura et al. | |
| D454,139 S | 3/2002 | Feldcamp | |
| 6,359,635 B1 | 3/2002 | Perttunen | |
| 6,393,430 B1 | 5/2002 | Van Ryzin | |
| D459,361 S | 6/2002 | Inagaki | |
| D463,444 S | 9/2002 | Istvan et al. | |
| 6,460,181 B1 | 10/2002 | Donnelly | |
| 6,486,870 B1 | 11/2002 | Kozu | |
| D467,252 S | 12/2002 | Lee | |
| D469,442 S | 1/2003 | Bohlen, Jr. et al. | |
| D470,857 S | 2/2003 | Anderson et al. | |
| D471,226 S | 3/2003 | Gray | |
| 6,532,459 B1 | 3/2003 | Berson | |
| 6,538,635 B1 | 3/2003 | Ringot | |
| D472,902 S | 4/2003 | Nashida et al. | |
| D473,236 S | 4/2003 | Robbin et al. | |
| D474,198 S | 5/2003 | Barnes | |
| D474,778 S | 5/2003 | Barnes | |
| D475,064 S | 5/2003 | Nashida et al. | |
| 6,563,515 B1 | 5/2003 | Reynolds et al. | |
| 6,577,330 B1 | 6/2003 | Tsuda et al. | |
| 6,600,936 B1 | 7/2003 | Karkkainen et al. | |
| D478,912 S | 8/2003 | Johnson | |
| D485,279 S | 1/2004 | DeCombe | |
| 6,678,891 B1 | 1/2004 | Wilcox et al. | |
| D486,499 S | 2/2004 | Hayashi et al. | |
| 6,741,268 B1 | 5/2004 | Hayakawa | |
| 6,757,365 B1 | 6/2004 | Bogard | |
| D495,339 S | 8/2004 | Gildred | |
| 6,775,659 B2 | 8/2004 | Clifton-Bligh | |
| 6,781,575 B1 | 8/2004 | Hawkins et al. | |
| D495,715 S | 9/2004 | Gildred | |
| 6,788,987 B2 | 9/2004 | Slechta et al. | |
| 6,801,849 B2 | 10/2004 | Szukala et al. | |
| 6,845,153 B2 | 1/2005 | Tiburtius et al. | |
| 6,850,255 B2 | 2/2005 | Muschetto | |
| 6,865,404 B1 | 3/2005 | Tikkala et al. | |
| D506,474 S | 6/2005 | Gildred | |
| 6,907,575 B2 | 6/2005 | Duarte | |
| D507,577 S | 7/2005 | Totten et al. | |
| 6,925,650 B1 | 8/2005 | Arsenault et al. | |
| D510,581 S | 10/2005 | Robbin et al. | |
| 6,959,207 B2 | 10/2005 | Keinonen et al. | |
| 6,968,179 B1 | 11/2005 | De Vries | |
| 6,975,712 B1 | 12/2005 | Schnarel et al. | |
| 6,978,473 B1 | 12/2005 | Nsonwu et al. | |
| 7,007,239 B1 | 2/2006 | Hawkins et al. | |
| 7,036,091 B1 | 4/2006 | Nguyen et al. | |
| 7,046,993 B2 | 5/2006 | Haaramo et al. | |
| D523,439 S | 6/2006 | Kuroda | |
| D523,440 S | 6/2006 | Hernandez et al. | |
| D523,868 S | 6/2006 | Kuroda | |
| 7,076,546 B1 | 7/2006 | Bates et al. | |
| 7,083,109 B2 | 8/2006 | Pouchak | |
| 7,086,008 B2 | 8/2006 | Capps et al. | |
| 7,089,287 B2 | 8/2006 | Bellotti et al. | |
| 7,099,862 B2 | 8/2006 | Fitzpatrick et al. | |
| D528,556 S | 9/2006 | Decombre | |
| 7,111,788 B2 | 9/2006 | Reponen | |
| 7,117,445 B2 | 10/2006 | Berger | |
| 7,137,073 B2 | 11/2006 | Kim et al. | |
| 7,174,516 B2 | 2/2007 | Chipchase | |
| 7,178,109 B2 | 2/2007 | Hewson et al. | |
| 7,187,761 B2 | 3/2007 | Bookstaff | |
| D540,340 S | 4/2007 | Cummins | |
| D543,986 S | 6/2007 | Rimas-Ribikauskas et al. | |
| D543,987 S | 6/2007 | Rimas-Ribikauskas et al. | |
| D543,992 S | 6/2007 | Vigesaa | |
| D544,875 S | 6/2007 | Wang et al. | |
| D544,877 S | 6/2007 | Sasser | |
| D545,324 S | 6/2007 | Decombe | |
| 7,231,229 B1 | 6/2007 | Hawkins et al. | |
| 7,236,576 B2 | 6/2007 | Schnarel et al. | |
| 7,236,780 B2 | 6/2007 | Benco et al. | |
| D545,827 S | 7/2007 | Evans et al. | |
| D545,832 S | 7/2007 | Armendariz | |
| D546,342 S | 7/2007 | Armendariz | |
| D547,321 S | 7/2007 | Viegers et al. | |
| 7,248,677 B2 | 7/2007 | Randall et al. | |
| 7,248,857 B1 | 7/2007 | Richardson et al. | |
| D548,239 S | 8/2007 | Rimas-Ribikauskas et al. | |
| D548,743 S | 8/2007 | Takahashi et al. | |
| D550,681 S | 9/2007 | Totten et al. | |
| D551,252 S | 9/2007 | Andre et al. | |
| D552,114 S | 10/2007 | Tolle et al. | |
| D554,142 S | 10/2007 | Cameron | |

(56) References Cited

U.S. PATENT DOCUMENTS

| | | |
|---|---|---|
| 7,280,652 B2 | 10/2007 | Bocking et al. |
| D554,652 S | 11/2007 | Shen et al. |
| D556,765 S | 12/2007 | Evans et al. |
| D557,268 S | 12/2007 | Fletcher |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,365 B2 | 3/2008 | Farmham et al. |
| 7,343,565 B2 | 3/2008 | Ying et al. |
| D565,586 S | 4/2008 | Shin et al. |
| D565,627 S | 4/2008 | Kase |
| D567,251 S | 4/2008 | Sadler |
| D567,817 S | 4/2008 | Kwag et al. |
| 7,353,034 B2 | 4/2008 | Haney |
| 7,360,174 B2 | 4/2008 | Grossman et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,298 S | 8/2008 | Chen et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| 7,440,910 B1 | 10/2008 | Ruvolo et al. |
| 7,444,342 B1 | 10/2008 | Hall et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D583,823 S | 12/2008 | Chen et al. |
| D584,737 S | 1/2009 | Stone et al. |
| D585,453 S | 1/2009 | Chen et al. |
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D588,150 S | 3/2009 | Stone et al. |
| 7,503,014 B2 | 3/2009 | Tojo et al. |
| 7,506,246 B2 | 3/2009 | Hollander |
| 7,512,652 B1 | 3/2009 | Appelman et al. |
| D589,970 S | 4/2009 | Bhat et al. |
| D590,407 S | 4/2009 | Watanabe et al. |
| D590,412 S | 4/2009 | Saft et al. |
| 7,519,912 B2 | 4/2009 | Moody et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| 7,536,654 B2 | 5/2009 | Anthony et al. |
| D593,574 S | 6/2009 | Guimaraes et al. |
| D593,576 S | 6/2009 | Ball et al. |
| D594,015 S | 6/2009 | Singh et al. |
| D594,465 S | 6/2009 | Hong et al. |
| D594,872 S | 6/2009 | Akimoto |
| 7,543,245 B2 | 6/2009 | Irimajiri |
| 7,546,543 B2 | 6/2009 | Louch et al. |
| 7,555,727 B2 | 6/2009 | Hawkins et al. |
| D596,192 S | 7/2009 | Shotel |
| 7,562,304 B2 | 7/2009 | Dixon et al. |
| 7,577,700 B2 | 8/2009 | Tolson et al. |
| 7,580,363 B2 | 8/2009 | Sorvari et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,811 S | 9/2009 | Watanabe et al. |
| D599,812 S | 9/2009 | Hirsch |
| D599,813 S | 9/2009 | Hirsch |
| D599,814 S | 9/2009 | Ogura et al. |
| D601,153 S | 9/2009 | Setiawan et al. |
| 7,587,215 B2 | 9/2009 | Chakraborty et al. |
| 7,587,683 B2 | 9/2009 | Ito et al. |
| D602,038 S | 10/2009 | Channell et al. |
| 7,603,628 B2 * | 10/2009 | Park .................. G06F 3/04817 715/744 |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,316 S | 11/2009 | Hoefnagels et al. |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| D607,002 S | 12/2009 | Jonasson et al. |
| 7,636,889 B2 | 12/2009 | Weber et al. |
| D608,364 S | 1/2010 | Walsh et al. |
| D608,366 S | 1/2010 | Matas |
| D608,367 S | 1/2010 | Scalisi et al. |
| D608,368 S | 1/2010 | Bamford |
| 7,646,745 B2 | 1/2010 | Caldwell et al. |
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| 7,665,033 B2 | 2/2010 | Byrne et al. |
| D611,056 S | 3/2010 | Langlois et al. |
| D611,484 S | 3/2010 | Mays et al. |
| D611,485 S | 3/2010 | Marashi |
| D611,489 S | 3/2010 | Bell et al. |
| D611,490 S | 3/2010 | Lee et al. |
| D612,394 S | 3/2010 | La et al. |
| D612,860 S | 3/2010 | Tarara et al. |
| 7,673,017 B2 | 3/2010 | Kim et al. |
| 7,685,520 B2 | 3/2010 | Rashkovskiy et al. |
| 7,685,530 B2 * | 3/2010 | Sherrard .............. G06F 16/285 715/764 |
| D613,300 S | 4/2010 | Chaudhri |
| D613,747 S | 4/2010 | Jonasson et al. |
| D614,191 S | 4/2010 | Takano et al. |
| D614,192 S | 4/2010 | Takano et al. |
| D614,633 S | 4/2010 | Watanabe et al. |
| D614,643 S | 4/2010 | Viegers et al. |
| D614,646 S | 4/2010 | Chen et al. |
| 7,702,543 B2 | 4/2010 | MacKay et al. |
| 7,703,031 B2 | 4/2010 | Nakagawa et al. |
| 7,705,833 B2 * | 4/2010 | Kim .................. H04M 1/72583 345/173 |
| D615,090 S | 5/2010 | Sogabe |
| D615,546 S | 5/2010 | Lundy et al. |
| D615,549 S | 5/2010 | Caine et al. |
| 7,720,498 B2 | 5/2010 | Lee |
| D617,804 S | 6/2010 | Hirsch |
| D617,805 S | 6/2010 | Scalisi et al. |
| D618,250 S | 6/2010 | Stallings et al. |
| 7,735,021 B2 | 6/2010 | Padawer et al. |
| 7,738,912 B1 | 6/2010 | Hawkins et al. |
| D619,593 S | 7/2010 | Fujioka et al. |
| D619,594 S | 7/2010 | Jonasson et al. |
| D620,948 S | 8/2010 | Scalisi et al. |
| D621,844 S | 8/2010 | Van Os |
| D621,845 S | 8/2010 | Anzures et al. |

(56) References Cited

U.S. PATENT DOCUMENTS

| | | | |
|---|---|---|---|
| D622,280 S | 8/2010 | Tarara | |
| 7,779,358 B1 * | 8/2010 | Gupta | G06F 16/54 |
| | | | 715/730 |
| D624,556 S | 9/2010 | Chaudhri | |
| 7,797,641 B2 | 9/2010 | Karukka et al. | |
| D625,325 S | 10/2010 | Vu et al. | |
| D626,136 S | 10/2010 | Fujimura | |
| D627,790 S | 11/2010 | Chaudhri | |
| D628,206 S | 11/2010 | Lemay | |
| 7,831,675 B2 | 11/2010 | Narayanaswami et al. | |
| 7,898,600 B2 | 3/2011 | Lee et al. | |
| 7,900,139 B2 * | 3/2011 | Hosotsubo | G06T 11/60 |
| | | | 715/247 |
| D638,025 S | 5/2011 | Saft et al. | |
| 7,971,222 B2 | 6/2011 | Ellis | |
| 8,015,187 B2 | 9/2011 | Choi et al. | |
| 8,032,470 B1 | 10/2011 | Heidenreich et al. | |
| 8,046,801 B2 | 10/2011 | Ellis et al. | |
| D652,843 S | 1/2012 | van Os | |
| 8,631,351 B2 | 1/2014 | Fong et al. | |
| 8,671,355 B2 * | 3/2014 | Pegg | G06F 3/04817 |
| | | | 715/765 |
| 8,893,025 B2 | 11/2014 | Vance et al. | |
| 9,160,828 B2 | 10/2015 | Vance et al. | |
| 9,195,966 B2 | 11/2015 | Vance et al. | |
| 9,210,247 B2 | 12/2015 | Vance et al. | |
| 9,304,659 B2 | 4/2016 | Sherrard et al. | |
| 9,355,382 B2 | 5/2016 | Vance et al. | |
| 9,363,378 B1 | 6/2016 | McDaniel | |
| 9,396,542 B2 | 6/2016 | Vance et al. | |
| 9,886,487 B2 | 2/2018 | Vance et al. | |
| 10,021,231 B2 * | 7/2018 | Vance | G06Q 10/107 |
| 10,177,990 B2 | 1/2019 | Vance et al. | |
| 10,178,519 B2 | 1/2019 | Vance et al. | |
| 10,191,623 B2 | 1/2019 | Vance et al. | |
| 10,510,008 B2 | 12/2019 | Vance et al. | |
| 2001/0044743 A1 | 11/2001 | McKinley et al. | |
| 2001/0046886 A1 | 11/2001 | Ishigaki | |
| 2002/0045960 A1 | 4/2002 | Phillips et al. | |
| 2002/0052754 A1 | 5/2002 | Joyce et al. | |
| 2002/0054164 A1 | 5/2002 | Uemura | |
| 2002/0059201 A1 | 5/2002 | Work | |
| 2002/0145623 A1 | 10/2002 | DeCombe | |
| 2003/0014179 A1 | 1/2003 | Szukala et al. | |
| 2003/0030670 A1 | 2/2003 | Duarte et al. | |
| 2003/0034878 A1 | 2/2003 | Hull et al. | |
| 2003/0078033 A1 | 4/2003 | Sauer et al. | |
| 2003/0164818 A1 | 9/2003 | Miller-Smith et al. | |
| 2003/0210265 A1 | 11/2003 | Haimberg | |
| 2003/0224816 A1 | 12/2003 | Kundaje et al. | |
| 2003/0225879 A1 | 12/2003 | Chipchase | |
| 2004/0017376 A1 | 1/2004 | Tagliabue et al. | |
| 2004/0041836 A1 | 3/2004 | Zaner et al. | |
| 2004/0046796 A1 | 3/2004 | Fujita | |
| 2004/0067751 A1 | 4/2004 | Vandermeijden | |
| 2004/0073643 A1 | 4/2004 | Hayes et al. | |
| 2004/0075691 A1 | 4/2004 | Moon | |
| 2004/0077340 A1 | 4/2004 | Forsyth | |
| 2004/0091093 A1 | 5/2004 | Bookstaff | |
| 2004/0100479 A1 | 5/2004 | Nakano et al. | |
| 2004/0102225 A1 | 5/2004 | Furuta et al. | |
| 2004/0113927 A1 | 6/2004 | Quinn et al. | |
| 2004/0119755 A1 | 6/2004 | Guibourge | |
| 2004/0119758 A1 | 6/2004 | Grossman et al. | |
| 2004/0122683 A1 | 6/2004 | Grossman et al. | |
| 2004/0122684 A1 | 6/2004 | Kaikuranta | |
| 2004/0133638 A1 | 7/2004 | Doss et al. | |
| 2004/0155908 A1 | 8/2004 | Wagner | |
| 2004/0162812 A1 | 8/2004 | Lane | |
| 2004/0172455 A1 | 9/2004 | Green et al. | |
| 2004/0185890 A1 | 9/2004 | Drort et al. | |
| 2004/0221239 A1 | 11/2004 | Hachigian et al. | |
| 2004/0235520 A1 | 11/2004 | Cadiz et al. | |
| 2004/0236749 A1 | 11/2004 | Cortright et al. | |
| 2004/0237048 A1 | 11/2004 | Tojo et al. | |
| 2004/0239982 A1 | 12/2004 | Gignac | |
| 2004/0250217 A1 | 12/2004 | Tojo et al. | |
| 2004/0268228 A1 | 12/2004 | Croney et al. | |
| 2004/0268265 A1 | 12/2004 | Berger | |
| 2005/0005235 A1 | 1/2005 | Satterfield et al. | |
| 2005/0010584 A1 | 1/2005 | Reponen | |
| 2005/0010876 A1 | 1/2005 | Robertson et al. | |
| 2005/0033603 A1 | 2/2005 | Suzuki et al. | |
| 2005/0033698 A1 | 2/2005 | Chapman | |
| 2005/0038856 A1 | 2/2005 | Krishnasamy et al. | |
| 2005/0039140 A1 | 2/2005 | Chen | |
| 2005/0041011 A1 | 2/2005 | Silfverberg et al. | |
| 2005/0059418 A1 | 3/2005 | Northcutt | |
| 2005/0060377 A1 | 3/2005 | Lo et al. | |
| 2005/0071780 A1 | 3/2005 | Muller et al. | |
| 2005/0079863 A1 | 4/2005 | Macaluso | |
| 2005/0086611 A1 | 4/2005 | Takabe et al. | |
| 2005/0091272 A1 | 4/2005 | Smith et al. | |
| 2005/0094205 A1 | 5/2005 | Lo et al. | |
| 2005/0114374 A1 | 5/2005 | Juszkiewicz et al. | |
| 2005/0118996 A1 | 6/2005 | Lee et al. | |
| 2005/0120306 A1 | 6/2005 | Klassen et al. | |
| 2005/0138574 A1 | 6/2005 | Lin | |
| 2005/0143135 A1 | 6/2005 | Brems et al. | |
| 2005/0143138 A1 | 6/2005 | Lee et al. | |
| 2005/0160376 A1 | 7/2005 | Sciammarella et al. | |
| 2005/0163290 A1 | 7/2005 | Gilles et al. | |
| 2005/0172001 A1 | 8/2005 | Zaner et al. | |
| 2005/0182837 A1 | 8/2005 | Harris et al. | |
| 2005/0188312 A1 | 8/2005 | Bocking et al. | |
| 2005/0209994 A1 | 9/2005 | Noro et al. | |
| 2005/0210104 A1 | 9/2005 | Torvinen | |
| 2005/0221807 A1 | 10/2005 | Karlsson et al. | |
| 2005/0229110 A1 | 10/2005 | Gegner et al. | |
| 2005/0235225 A1 | 10/2005 | Pradhan et al. | |
| 2005/0235226 A1 | 10/2005 | Watanabe et al. | |
| 2005/0235251 A1 | 10/2005 | Arend et al. | |
| 2005/0243979 A1 | 11/2005 | Starbuck et al. | |
| 2005/0245236 A1 | 11/2005 | Servi et al. | |
| 2005/0246654 A1 | 11/2005 | Hally et al. | |
| 2005/0261011 A1 | 11/2005 | Scott | |
| 2005/0261032 A1 | 11/2005 | Seo et al. | |
| 2005/0262186 A1 | 11/2005 | Szeto et al. | |
| 2005/0262204 A1 | 11/2005 | Szeto et al. | |
| 2005/0268237 A1 | 12/2005 | Crane et al. | |
| 2005/0278652 A1 | 12/2005 | Scholz | |
| 2006/0009249 A1 | 1/2006 | Fu et al. | |
| 2006/0010395 A1 | 1/2006 | Aaltonen | |
| 2006/0030347 A1 | 2/2006 | Biswaas | |
| 2006/0048076 A1 | 3/2006 | Vronay et al. | |
| 2006/0053379 A1 | 3/2006 | Henderson et al. | |
| 2006/0055700 A1 | 3/2006 | Niles et al. | |
| 2006/0058010 A1 | 3/2006 | Williams et al. | |
| 2006/0084410 A1 | 4/2006 | Sutaria et al. | |
| 2006/0094404 A1 | 5/2006 | Burgess | |
| 2006/0101350 A1 | 5/2006 | Scott | |
| 2006/0112354 A1 * | 5/2006 | Park | G06F 3/04817 |
| | | | 715/835 |
| 2006/0123360 A1 | 6/2006 | Anwar et al. | |
| 2006/0140015 A1 | 6/2006 | Kasamsetty | |
| 2006/0141996 A1 | 6/2006 | Huh | |
| 2006/0143574 A1 | 6/2006 | Ito et al. | |
| 2006/0146765 A1 * | 7/2006 | Van De Sluis | H04L 67/34 |
| | | | 370/338 |
| 2006/0148499 A1 | 7/2006 | Chie | |
| 2006/0148522 A1 | 7/2006 | Chipchase et al. | |
| 2006/0168539 A1 | 7/2006 | Hawkins et al. | |
| 2006/0170945 A1 | 8/2006 | Bill | |
| 2006/0174121 A1 | 8/2006 | Omae et al. | |
| 2006/0174269 A1 | 8/2006 | Hansen-Turton | |
| 2006/0212829 A1 | 9/2006 | Yahiro et al. | |
| 2006/0223518 A1 | 10/2006 | Haney | |
| 2006/0224675 A1 | 10/2006 | Fox et al. | |
| 2006/0242581 A1 | 10/2006 | Manion et al. | |
| 2006/0242597 A1 | 10/2006 | Park | |
| 2006/0253787 A1 | 11/2006 | Fogg | |
| 2006/0277488 A1 * | 12/2006 | Cok | G06F 3/04855 |
| | | | 715/784 |
| 2006/0293057 A1 | 12/2006 | Mazerski et al. | |

(56) References Cited

U.S. PATENT DOCUMENTS

| | | |
|---|---|---|
| 2007/0011617 A1 | 1/2007 | Akagawa et al. |
| 2007/0026645 A1 | 2/2007 | Lieber et al. |
| 2007/0027920 A1* | 2/2007 | Alvarado ............ H04L 67/04 |
| 2007/0032267 A1 | 2/2007 | Haitani et al. |
| 2007/0033540 A1 | 2/2007 | Bridges et al. |
| 2007/0043688 A1 | 2/2007 | Kountz et al. |
| 2007/0060206 A1 | 3/2007 | Dam Nielsen et al. |
| 2007/0067738 A1 | 3/2007 | Flynt et al. |
| 2007/0072586 A1 | 3/2007 | Morhenn et al. |
| 2007/0073874 A1 | 3/2007 | Moghaddam et al. |
| 2007/0079246 A1 | 4/2007 | Morillon et al. |
| 2007/0118813 A1 | 5/2007 | Forstall et al. |
| 2007/0129112 A1 | 6/2007 | Tarn |
| 2007/0135103 A1 | 6/2007 | Middleton |
| 2007/0136360 A1 | 6/2007 | Randall et al. |
| 2007/0136687 A1 | 6/2007 | Pak |
| 2007/0150830 A1 | 6/2007 | Ording et al. |
| 2007/0162862 A1 | 7/2007 | Ogasawara et al. |
| 2007/0168262 A1 | 7/2007 | Morotomi et al. |
| 2007/0174389 A1 | 7/2007 | Armstrong et al. |
| 2007/0198947 A1 | 8/2007 | Cox et al. |
| 2007/0226645 A1 | 9/2007 | Kongqiao et al. |
| 2007/0250936 A1 | 10/2007 | Nakamura et al. |
| 2007/0268908 A1 | 11/2007 | Linkola et al. |
| 2007/0271528 A1 | 11/2007 | Park et al. |
| 2008/0014982 A1 | 1/2008 | Foxenland |
| 2008/0022228 A1 | 1/2008 | Kwon et al. |
| 2008/0034317 A1* | 2/2008 | Fard ................ G06T 13/80 715/781 |
| 2008/0059570 A1 | 3/2008 | Bill |
| 2008/0081653 A1 | 4/2008 | Mock et al. |
| 2008/0086703 A1 | 4/2008 | Flynt et al. |
| 2008/0098311 A1* | 4/2008 | Delarue ............ G06F 16/54 715/739 |
| 2008/0111826 A1 | 5/2008 | Endrikhovski et al. |
| 2008/0122870 A1 | 5/2008 | Brodersen et al. |
| 2008/0158189 A1* | 7/2008 | Kim ................ G06F 3/04886 345/173 |
| 2008/0172030 A1 | 7/2008 | Blomquist |
| 2008/0189614 A1* | 8/2008 | Jeong ................ G06F 3/0482 715/716 |
| 2008/0189627 A1 | 8/2008 | Nikitin et al. |
| 2008/0194934 A1 | 8/2008 | Ray et al. |
| 2008/0215978 A1 | 9/2008 | Bamba |
| 2008/0220751 A1 | 9/2008 | De Bast |
| 2008/0220752 A1 | 9/2008 | Forstall et al. |
| 2008/0235248 A1 | 9/2008 | Krantz et al. |
| 2008/0256170 A1 | 10/2008 | Hayashi et al. |
| 2008/0261569 A1 | 10/2008 | Britt et al. |
| 2008/0263069 A1 | 10/2008 | Harris et al. |
| 2008/0280600 A1 | 11/2008 | Zhou |
| 2008/0282158 A1* | 11/2008 | Aaltonen ............ G06F 3/0482 715/700 |
| 2008/0288612 A1 | 11/2008 | Kwon |
| 2008/0288880 A1 | 11/2008 | Reponen et al. |
| 2009/0013048 A1 | 1/2009 | Partaker et al. |
| 2009/0040875 A1 | 2/2009 | Buzescu et al. |
| 2009/0043847 A1 | 2/2009 | Laurila |
| 2009/0055484 A1 | 2/2009 | Vuong et al. |
| 2009/0077496 A1 | 3/2009 | Aravamudan et al. |
| 2009/0100363 A1* | 4/2009 | Pegg ................ G06F 3/04817 715/765 |
| 2009/0164923 A1 | 6/2009 | Ovi |
| 2009/0187630 A1 | 7/2009 | Narayanaswami et al. |
| 2009/0193512 A1 | 7/2009 | Buckley et al. |
| 2009/0199120 A1 | 8/2009 | Baxter et al. |
| 2009/0228513 A1 | 9/2009 | Tian |
| 2009/0300518 A1* | 12/2009 | Mock ................ H04L 67/02 715/753 |
| 2009/0303188 A1* | 12/2009 | Triplett ............ G06F 3/04847 345/173 |
| 2010/0004008 A1 | 1/2010 | Abolrous et al. |
| 2010/0020727 A1 | 1/2010 | Narayan et al. |
| 2010/0020953 A1 | 1/2010 | Lidstrom et al. |
| 2010/0050123 A1 | 2/2010 | Sherrard et al. |
| 2010/0062753 A1* | 3/2010 | Wen ................ H04M 1/2746 455/418 |
| 2010/0064231 A1 | 3/2010 | Gupta |
| 2010/0094837 A1 | 4/2010 | O'Sullivan et al. |
| 2010/0095009 A1 | 4/2010 | Matuszewski et al. |
| 2010/0144331 A1 | 6/2010 | Koberg et al. |
| 2010/0153886 A1 | 6/2010 | Hautala |
| 2010/0180001 A1 | 7/2010 | Hardt |
| 2010/0190467 A1 | 7/2010 | Scott et al. |
| 2010/0190468 A1 | 7/2010 | Scott et al. |
| 2010/0241544 A1 | 9/2010 | Benson et al. |
| 2010/0245262 A1* | 9/2010 | Vance ................ G06Q 10/107 345/173 |
| 2010/0248701 A1 | 9/2010 | Vance et al. |
| 2010/0250606 A1 | 9/2010 | Vance et al. |
| 2010/0287504 A1 | 11/2010 | Vance et al. |
| 2010/0333029 A1 | 12/2010 | Smith et al. |
| 2011/0029892 A1 | 2/2011 | Kurtz et al. |
| 2011/0258547 A1 | 10/2011 | Symons et al. |
| 2012/0071244 A1 | 3/2012 | Gillo et al. |
| 2013/0019173 A1 | 1/2013 | Kotler et al. |
| 2013/0019203 A1 | 1/2013 | Kotler et al. |
| 2013/0024780 A1 | 1/2013 | Sutedja et al. |
| 2014/0033071 A1 | 1/2014 | Gruber et al. |
| 2014/0220942 A1 | 8/2014 | Vance et al. |
| 2015/0072644 A1 | 3/2015 | Sherrard et al. |
| 2015/0220220 A1 | 8/2015 | Sherrard et al. |
| 2017/0124175 A1 | 5/2017 | Vance et al. |
| 2017/0339079 A1 | 11/2017 | Appelman et al. |
| 2019/0116471 A1 | 4/2019 | Vance et al. |
| 2020/0167673 A1 | 5/2020 | Vance et al. |

FOREIGN PATENT DOCUMENTS

| | | |
|---|---|---|
| EP | 1246434 A1 | 10/2002 |
| EP | 1469374 A1 | 10/2004 |
| EP | 1482758 A1 | 12/2004 |
| EP | 1571808 A1 | 9/2005 |
| EP | 1608190 A1 | 12/2005 |
| JP | 07-129363 A | 5/1995 |
| JP | 08-123658 A | 5/1996 |
| JP | 09-083630 A | 3/1997 |
| JP | 09-311661 A | 12/1997 |
| JP | H11-088496 A | 3/1999 |
| JP | H11-327741 A | 11/1999 |
| JP | 2000-259304 A | 9/2000 |
| JP | 2000-348058 A | 12/2000 |
| JP | 2002-009899 A | 1/2002 |
| JP | 2003-198705 A | 7/2003 |
| JP | 2004-208217 A | 7/2004 |
| JP | 2004-348601 A | 12/2004 |
| JP | 2005-072958 A | 3/2005 |
| JP | 3834039 B2 | 10/2006 |
| KR | 10-2002-0069964 A | 9/2002 |
| KR | 10-2004-0024967 A | 3/2004 |
| KR | 10-2005-0043148 A | 5/2005 |
| KR | 10-2006-0042808 A | 5/2006 |
| KR | 10-2007-0029009 A | 3/2007 |
| KR | 10-2008-0004127 A | 1/2008 |
| KR | 10-2008-0019614 A | 3/2008 |
| KR | 10-2008-0079716 A | 9/2008 |
| WO | WO 00/25501 A1 | 5/2000 |
| WO | WO 03/044756 A1 | 5/2003 |
| WO | WO 03/062976 A1 | 7/2003 |
| WO | WO 2005/045799 A1 | 5/2005 |
| WO | WO 2005/064441 A1 | 7/2005 |
| WO | WO 2005/120112 A1 | 12/2005 |
| WO | WO 2006/016227 A2 | 2/2006 |
| WO | WO 2006/067567 A1 | 6/2006 |
| WO | WO 2007/093997 A1 | 8/2007 |
| WO | WO 2007/143678 A2 | 12/2007 |
| WO | WO 2008/030776 A2 | 3/2008 |
| WO | WO 2010/111610 A2 | 9/2010 |
| WO | WO 2010/111614 A2 | 9/2010 |
| WO | WO 2010/111637 A2 | 9/2010 |
| WO | WO 2010/111642 A2 | 9/2010 |
| WO | WO 2010/111643 A2 | 9/2010 |

(56) References Cited

FOREIGN PATENT DOCUMENTS

| WO | WO 2010/111670 A2 | 9/2010 |
|---|---|---|
| WO | WO 2010/111675 A2 | 9/2010 |
| WO | WO 2010/111679 A2 | 9/2010 |

OTHER PUBLICATIONS

Alltel Launches 'My Circle,' a One-of-a-Kind Program That Gives Customers Free Calls to Any Network or Number They Choose, Business Wire, Apr. 20, 2006, pp. 1, New York.
Alltel's 'My Circle' Plan Lets Subscribers Adds 10 Numbers for Unlimited Calls, Wireless News, Apr. 23, 2006, pp. 2, Coventry.
Belson, K., Alltel to Offer Free-Calling Plan, With Limits, New York Times, Apr. 21, 2006, pp. C9, New York.
Boy Genius, LG Xenon hitting AT&T Before Christmas?, http://www.boygeniusreport.com/2008/09/24/lg-xenon-hitting-att-before-christmas/, Sep. 24, 2008, pp. 1.
Cuneo, A.Z., Alltel Gets Aggressive in Telecom War, Advertising Age, Chicago (Midwest region edition), Apr. 24, 2006, vol. 77, Issue 17, pp. 8.
Larson, V., Alltel's free wireless calling plan paying off, Knight Rider Tribune Business News, May 2005, pp. 2.
LG Xenon User Guide, AT&T, Apr. 8, 2009, pp. 146.
MobileCom Provides All Residential Pay as You Go Subscribers the Ability to Talk for 1 Piaster Per Minute Day and Night, www.albawaba.com, Mar. 14, 2006.
Sellers, P., MCI Communications Yes, Brands Can Still Work Magic, www.money.cnn.com, Feb. 7, 1994.
Weisser, C., et al., What do you pay to stay connected?, Money Magazine, http://money.cnn.com/2003/11/20/pf/portability_strategy_0312/index.htm, Nov. 24, 2003.
European Search Report in European Application No. 06813204.2 dated Sep. 6, 2011.
Second Office Action in Chinese Application No. 200680020479.9 dated Mar. 22, 2012.
Office Action in Canadian Application No. 2588250 dated Aug. 23, 2013.
International Search Report (PCT/US2010/028954), dated Oct. 27, 2010.
International Preliminary Report on Patentability in application No. PCT/US2010/028954 dated Sep. 27, 2011.
International Search Report (PCT/US2010/028960), dated Oct. 26, 2010.
International Preliminary Report on Patentability in application No. PCT/US2010/028960 dated Sep. 27, 2011.
International Search Report (PCT/US2010/028947), dated Nov. 12, 2010.
International Preliminary Report on Patentability in application No. PCT/US2010/028947 dated Sep. 27, 2011.
Office Action in Indian Application No. 10055/DELNP/2007 dated Jun. 8, 2018.
Office Action in R.O.C. Application No. 098304597 dated Dec. 15, 2011, in 4 pages.
International Search Report (PCT/US2010/028894), dated Nov. 12, 2010.
International Preliminary Report on Patentability in application No. PCT/US2010/028894 dated Sep. 27, 2011.
International Search Report issued in connection with PCT/US2010/028857, dated Oct. 11, 2010.
International Preliminary Report on Patentability in application No. PCT/US2010/028857 dated Sep. 27, 2011.
International Search Report issued in connection with PCT/US2010/028863, dated Oct. 22, 2010.
International Preliminary Report on Patentability in application no. PCT/2010/028863 dated Sep. 27, 2011.
International Search Report (PCT/US2010/028905), dated Nov. 12, 2010.
International Preliminary Report on Patentability in application No. PCT/US2010/028905 dated Sep. 27, 2011.
International Search Report issued in connection with PCT/US2010/028904, dated Nov. 8, 2010.
International Preliminary Report on Patentability in application No. PCT/US/2010/028904 dated Sep. 27, 2011.
First Office Action in European Application No. 07812026.8 dated Jul. 17, 2012.
International Search Report (PCT/US2007070475), dated Jun. 29, 2011.
Office Action in Canadian Application No. 2657240 dated Sep. 3, 2013.

\* cited by examiner

MANAGING EXECUTABLE COMPONENT GROUPS FROM SUBSET OF USER EXECUTABLE COMPONENTS

CROSS-REFERENCE TO RELATED APPLICATION

This application is a continuation of U.S. patent application Ser. No. 16/009,823, entitled MANAGING CONTACT GROUPS FROM SUBSET OF USER CONTACTS and filed on Jun. 15, 2018, which in turn is a continuation of U.S. patent application Ser. No. 14/961,798, now U.S. Pat. No. 10,021,231, entitled MANAGING CONTACT GROUPS FROM SUBSET OF USER CONTACTS and filed on Dec. 7, 2015, which in turn is a continuation of U.S. patent application Ser. No. 12/413,390, now U.S. Pat. No. 9,210,247, entitled MANAGING CONTACT GROUPS FROM SUBSET OF USER CONTACTS and filed on Mar. 27, 2009, the disclosures of which are incorporated herein by reference.

BACKGROUND

Generally described, telecommunications devices and communication networks facilitate the collection and exchange of information. Utilizing a communication network and relevant communication protocols, a telecommunications device can engage in audio and/or data communications with other telecommunications devices, such as voice calls, video calls, messaging (e.g., short message service ("SMS") or multimedia messaging service ("MMS"), content streaming, instant messaging, resource browsing (e.g., Web browsing), and the like.

To facilitate communications, telecommunications devices can be associated with software and hardware components that allow the telecommunications device to maintain contact information, such as telephone numbers, email addresses, messaging addresses, etc., utilized to establish and engage in communications via available communication channels. Typically, such contact information is maintained as contact information in which all known contact information for an identified entity, such as user, can be presented to a telecommunications device user. For example, a telecommunications device may present a user interface in which the contact information associated with a selected individual is presented in a list-based format. In another example, a telecommunications device with voice calling capabilities may maintain a "last call list" that keeps track of telephone numbers of the most recent incoming calls to or outgoing calls from the telecommunications device.

Although contact management user interfaces and software can facilitate the input and management of contact information for a larger set of contacts, typical contact management approaches can become deficient as the set of entities associated with a user grows. In one example, typical call list approaches are limited in the number of contacts identified in the user interfaces (e.g., the last 4 numbers called). Accordingly, such approaches can become deficient as the number of incoming or outgoing communications (e.g., voice calls) increases because potentially desired contacts are removed from the display based on order of the most recent incoming or outgoing communications.

In another example, typical contact management approaches relate to the presentation of the entire set of contacts that are associated with a user, such as in alphabetical order. As the number of contacts maintained in the telecommunications device, or on behalf of the telecommunications device, grows, users may have increased difficulty in identifying the contact information of specific entities. Additionally, for each contact, the typical contact management approach identifies all known contact information (e.g., phone numbers, IM aliases, email addresses, etc.) without regard to a desired, or preferred, communication method. Additionally, typical contact management approaches are inefficient in the accessibility of select contact information and the establishment of options or actions that can be initiated by the telecommunications device user via a number of user interfaces.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
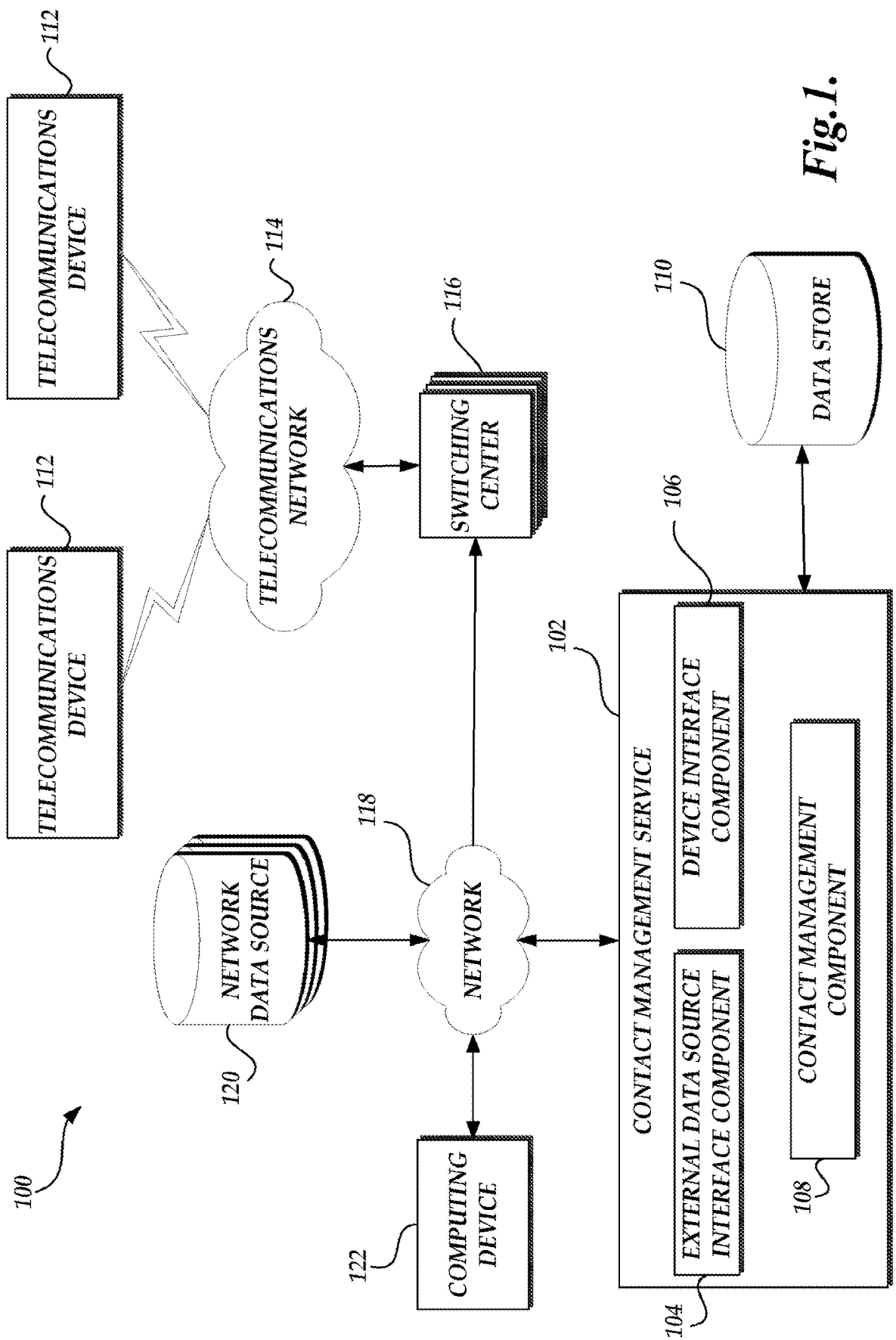
FIG. 1 is a block diagram illustrative of one embodiment of a telecommunications environment including a number of telecommunications devices and a contact management service.

Generally described, the present disclosure is directed to managing a subset of user contacts on a telecommunications device. Specifically, in one embodiment, aspects of the disclosure will be described with regard to determining at least two contact groups from a subset of contacts accessible by a telecommunications device and generating a contact display including at least one contact group from the subset based on a current context of a user of the telecommunications device. The current context may, for example, be one or more of a location, time, date, and the like. In one embodiment, the user of the telecommunications device can initially select the members of each of the contact groups from the subset of contacts. In this case, the user of the telecommunications device may also select and associate a context with each of the user-selected groups. Alternatively, a context associated with each of the user-selected groups may be determined automatically based on communication events between the user and the members of each group. In another embodiment, rather than being user-selected, the members of the at least two contact groups may be determined automatically based on a context associated with the user of the telecommunications device and a plurality of user communication events associated with the context.

In another embodiment, aspects of the disclosure will be described with regard to determining at least two contact groups from a subset of contacts accessible by a telecommunications device and generating a contact display including a representation of at least a portion of the first and second contact groups and a divider display object. Illustratively, the at least two contact groups can be determined in response to an add divider input initiated by a user of the telecommunications device. The divider display object generated in the contact display partitions the first contact group from the second contact group. In other embodiments, the divider display object can be repositioned to modify members of the contact groups. In still further embodiments, a plurality of divider display objects can be generated for visually partitioning other additional contact groups from the subset of contacts.

Although aspects of the present disclosure will be described with regard to an illustrative telecommunications environment and component interactions, telecommunications protocols, flow diagrams, and user interfaces, one skilled in the relevant art will appreciate that the disclosed embodiments are illustrative in nature and should not be construed as limiting. Specifically, although the term telecommunications device is used in this document, the term represents any type of device having a component for communicating with one or more other devices via one or more communication paths. Such communication paths can include wireless communication paths (via infra-red, RF, optical, terrestrial, or satellite communication media) and wired communication paths.

With reference now to FIG. 1, a block diagram illustrative of a telecommunications environment 100 for managing a subset of user contacts, and particularly for managing at least two contact groups from the subset of user contacts, will be described. A contact may correspond to an individual person, an identifier associated with a person such as a telephone number, a group of people, an identifier associated with a group of people, and the like. The telecommunications environment 100 can include a contact management service 102. In an illustrative embodiment, the contact management service 102 may be utilized to provide, maintain, or transmit contact group information to one or more telecommunications devices, as will be described below.

For each telecommunications device user, the contact group information may correspond to information associated with the generation of contact groups from a subset of user contacts accessible by a telecommunications device. The contact group information may be generated, at least in part, from information corresponding to interaction with individual users of telecommunications devices and maintained in a data store 110. Additionally, the contact management service 102 may obtain additional information from external sources, such as network-based data sources 120. The additional information may become part of the contact group information. Even further, the additional information may be used by the contact management service 102 to generate or process the contact group information. Such network-based data sources may include web sites, location based services, social network services, telecommunications services, message publication services, etc. While the data store 110 is depicted in FIG. 1 as being local to the contact management service 102, those skilled in the art will appreciate that the data store 110 may be remote to the contact management service 102 and/or may be a network based service itself.

While the contact management service 102 is depicted in FIG. 1 as implemented by a single computing device in the telecommunications environment 100, this is illustrative only. The contact management service 102 may be embodied in a plurality of computing devices, each executing an instance of the contact management service. A server or other computing device implementing the contact management service 102 may include memory, processing unit(s), and computer readable medium drive(s), all of which may communicate with one another by way of a communication bus. The network interface may provide connectivity over the network 118 and/or other networks or computer systems. The processing unit(s) may communicate to and from memory containing program instructions that the processing unit(s) executes in order to operate the contact management service 102. The memory generally includes RAM, ROM, and/or other persistent and auxiliary memory.

As illustrated in FIG. 1, the contact management service 102 can include an external data source interface component 104 for obtaining external information from network data sources 120, such as location data, contact data, and other supplemental data that can be incorporated, directly or indirectly, into the contact group information. Examples of external information can include user contact information, user communication events, contextual data associated with a telecommunications device user and with user communication events, such as time, date, location, and the like; contextual data associated with contacts of the user and with user contact communication events, such as time, date, location, and the like; social networking information; current status information associated with the user and/or user contacts; and the like. The contact management service 102 can also include a device interface component 106 for obtaining information from one or more telecommunication devices (e.g., location data for telecommunications device (s), IP addresses assigned to computing device(s), etc.). The contact management service 102 can further include a contact management component 108 for processing telecommunications device information and external information in determining at least two contact groups from a subset of contacts accessible by a telecommunications device and in further processing such contact group information, as will be further described further below in reference to FIG. 3.

One skilled in the relevant art will appreciate that the contact management service 102 may correspond to a number of computer devices, such as server computing devices. Additionally, the external data source interface component 104, device interface component 106, and contact management component 108 may be implemented in a single computing device or across multiple computing devices. Likewise, although the contact management data store 110 is illustrated as local to the contact management service 102, the data store 110 can correspond to a distributed data store and/or network-based data store. One skilled in the relevant art will also appreciate that the contact management service 102 may include any one of a number of additional hardware and software components that would be utilized in the illustrative computerized network environment to carry out the illustrative functions of the service 102 and/or of the individually identified components.

With continued reference to FIG. 1, the telecommunications environment 100 can include a number of telecommunications devices 112 or other computing devices 122, each associated with a user. The telecommunication devices 112 or other computing devices 122 can generate the displays that facilitate interaction of a user with other users. The telecommunications devices 112 can correspond to a wide variety of devices or components that are capable of initiating, receiving, or facilitating communications over a communication network including, but not limited to, personal computing devices, hand held computing devices, integrated components for inclusion in computing devices, home electronics, appliances, vehicles, machinery, landline telephones, VoIP telephones, cordless telephones, cellular telephones, smart phones, modems, personal digital assistants, laptop computers, gaming devices, media players, and the like. In an illustrative embodiment, the telecommunications devices 112 include a wide variety of software and hardware components for establishing communications over one or more communication networks, including cellular telecommunications network 114, a wired telecommunications network (not shown) and/or an IP-based telecommunications network (not shown). Illustrative components of a telecommunications device 112 will be described in greater detail with regard to FIG. 2.

In an illustrative embodiment, the telecommunications environment 100 can include a number of additional components, systems, and/or subsystems for facilitating communications with the telecommunications devices 112 and/or the contact management service 102. The additional components can include one or more switches or switching centers 116 (in GSM embodiments, Mobile Switching Centers or MSCs) for establishing communications with the telecommunications devices 112 via the telecommunication network 114, such as a cellular radio access network, an IP-based telecommunications network based on the family of IEEE 802.11 technical standards ("WiFi") or IEEE 802.16 standards ("WiMax"), a converged wireless telecommunications network such as Unlicensed Mobile Access (UMA) or General Access Network (GAN), and other wired and wireless networks. The operation of telecommunication networks, such as telecommunication network 114 are well known and will not be described in greater detail. As illustrated in FIG. 1, the switching center 116 includes interfaces for establishing various communications via a communication network 118, such as the Internet, intranets, private networks and point to point networks, generally referred to as the "network." Although the telecommunications network 114 is illustrated as a single communication network, one skilled in the relevant art will appreciate that the communication network can be made up of any number of public or private communication networks and/or network connections.

Figure 2:
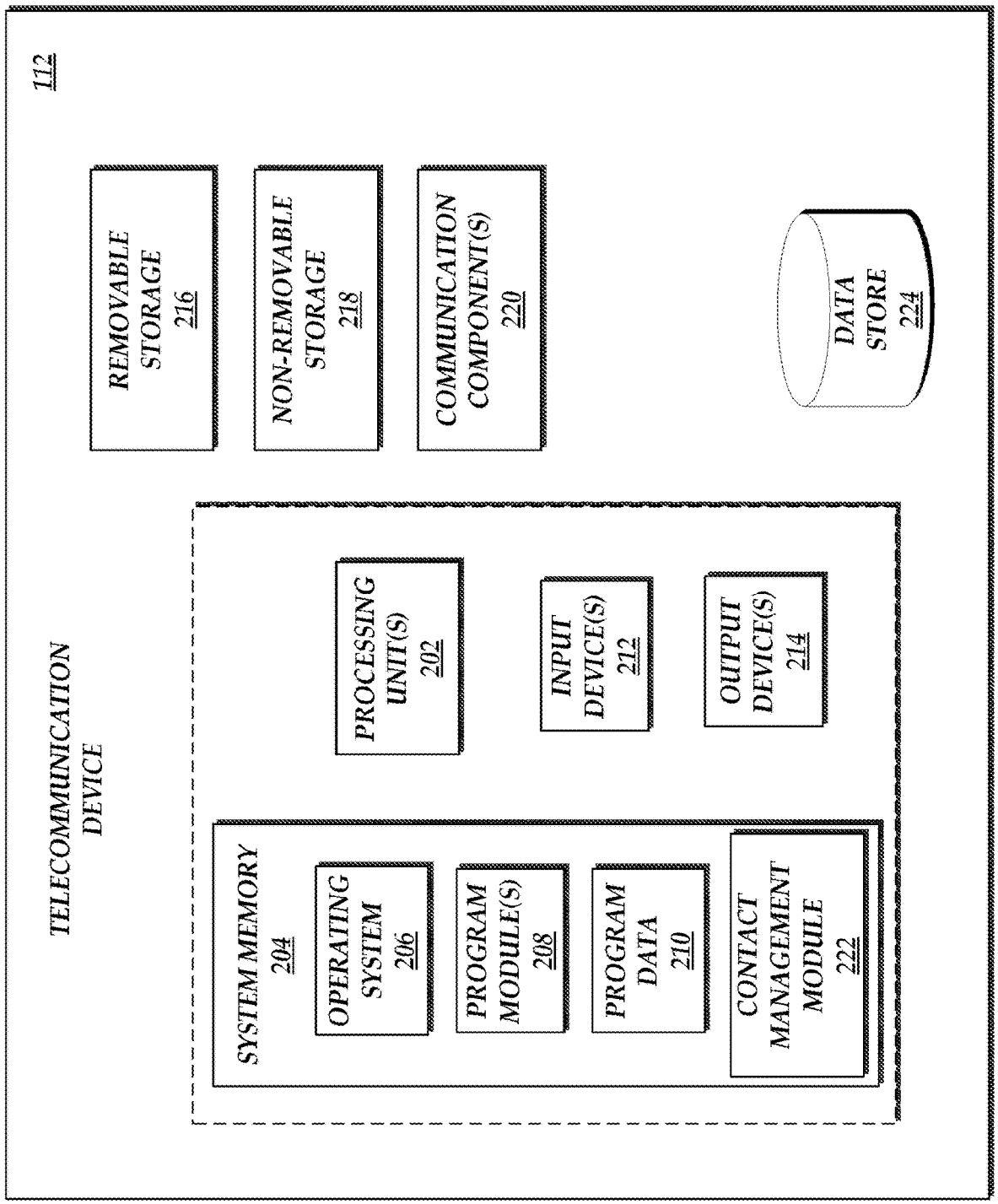
FIG. 2 is a block diagram illustrative of components of a telecommunications device for use in generation, management, and display of user contact information.

With reference now to FIG. 2, illustrative components of a telecommunications device 112 for use in the creation and display of contact group displays will be described. The telecommunications device 112 may include one or more processing units 202, such as one or more CPUs. The telecommunications device 112 may also include system memory 204, which may correspond to any combination of volatile and/or non-volatile storage mechanisms. The system memory 204 may store information which provides an operating system component 206, various program modules 208, program data 210, a contact management module 222, and/or other components. As will be explained in greater detail below, the contact management module 222 stored in system memory of the telecommunications device 112 may perform all or some of the functions described above in connection with the contact management component 108 of the contact management service 102 (FIG. 1). The above-enumerated list of components is representative and is not exhaustive of the types of functions performed, or components implemented, by the telecommunications device 112. One skilled in the relevant art will appreciate that additional or alternative components may also be included in the telecommunication device 112 to carry out other intended functions such as a mobile telephone functions.

The telecommunications device 112 performs functions by using the processing unit(s) 202 to execute instructions provided by the system memory 204. The telecommunications device 112 may also include one or more input devices 212 (keyboard, mouse device, specialized selection keys, etc.) and one or more output devices 214 (displays, printers, audio output mechanisms, etc.). Illustrative user interfaces for a telecommunications device 112 will be described with regard to FIGS. 4A-4B, FIGS. 5A-5B, FIG. 6B, and FIGS. 7A-7B below.

With continued reference to FIG. 2, the telecommunications device 112 may also include one or more types of removable storage 216 and one or more types of non-removable storage 218. Still further, the telecommunications device 112 can include communication components 220 for facilitating communication via wired and wireless telecommunications networks, such as telecommunications network 114 and network 118 (FIG. 1). In an illustrative embodiment, the communication components 220 can facilitate the bi-lateral transfer of data between the telecommunications device 112 and the contact management system 102 (FIG. 1). Examples of various communication protocols include, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, and similar technologies).

As previously described, in accordance with an aspect of the present disclosure, a telecommunications device 112 can generate one or more displays on a user interface via an output device 214. In an illustrative embodiment, the displays include various display objects that represent user contacts, identifiers of contact groups, contact dividers, or combinations thereof. In an illustrative embodiment, display objects may be selectable by a user via any one of a variety of input methods and devices. Additionally, the determination of the display objects that are included in the displays may be predetermined, automatically determined (in real time or semi-real time), or manually configured/managed according to user-specified criteria. Further, the display and formatting of the display objects and the illustrative displays may be specified according to specific telecommunication device capabilities, service provider specifications, or user configurations.

Figure 3:
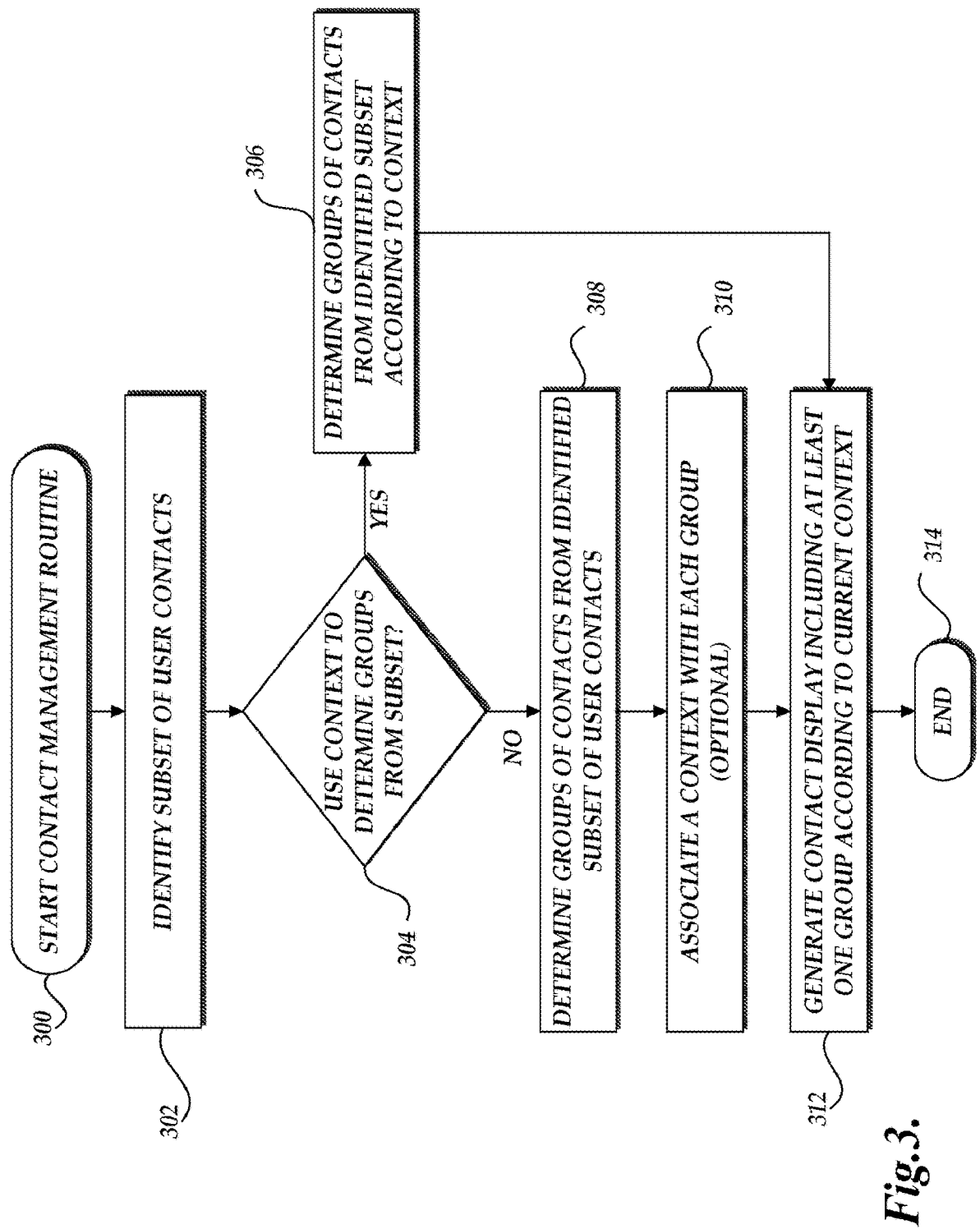
FIG. 3 is a flow diagram illustrative of a contact management routine implemented by a telecommunications device and/or within the telecommunications environment of FIG. 1 for managing a subset of user contacts and generating a contact display on a telecommunications device based on a current context of the telecommunications device user.

With reference now to FIG. 3, one embodiment of a contact management routine 300 implemented by a contact management service 102 of the telecommunications device 112 to generate a contact group display will be described.

Routine 300 will be described as being generally performed by the contact management service 102. However, one skilled in the relevant art will appreciate that actions/steps outlined for routine 300 may be implemented by one or many computing devices/components that are associated with the telecommunications environment 100. Accordingly, any functionality described in reference to routine 300 could be generally performed by any component in the telecommunications environment 100, including contact management module 222 of the telecommunications device 112, other modules, or combinations thereof. Thus, the following illustrative embodiments should not be construed as limiting.

At block 302, the contact management service 102 identifies a subset of user contacts from a set of user contacts. As similarly set forth above, a user contact may correspond to an individual person, an identifier associated with a person such as a telephone number, a group of people, an identifier associated with a group of people, and the like. In some embodiments, the set of user contacts from which the subset is identified is not limited and, in others, it may be limited such that only those contacts that the device has access to without requiring further input by user are included in the set. In other embodiments, the set from which the subset is identified may be further limited to contacts known to the user, contacts identified in one or more electronic address books, contacts having user-specified characteristics, and the like.

Additionally, in one illustrative embodiment, the subset of contacts can be selected by the user and subsequently maintained, for example, in data store 110 for future identification and access by the contact management service 102.

In another embodiment, a portion of the subset of contacts can be selected by the user of the telecommunications device 112, while a remaining portion of the subset of contacts are selected automatically based on one or more other factors. In one example, the factor used to select the remaining portion of the subset of contacts can be a frequency of communication between the user and one or more user contacts accessible by the telecommunications device 112. In this example, the contact management service 102 monitors communications between the user and each of the user's contacts accessible by the telecommunications device 112 and maintains data associated with the monitored communications. Based on the monitored communications and corresponding maintained data, the contact management service 102 may determine a frequency of communication between the user and each of the user's contacts. This information can then be used to determine the remaining portion of the subset of contacts. In one illustrative embodiment, the remaining portion of the subset of contacts can be selected based on the user contacts that have been in communication with the user the most number of times. In other embodiments, the contact management service 102 may track the types of communications between the user and the user's contacts, such as SMS messages, MMS messages, emails, voice calls, and the like, and then select the remaining portion of the subset of contacts based on the frequency of one type of communication or an aggregation of some or all types of communications. In addition, if aggregated, one type of communication can be weighted over other types. Even further, in other embodiments, the contact management service 102 may track only those communications initiated by the user to select the remaining portion of the subset of contacts based on the user's frequency of initiating communication with each of the user's contacts. Yet further, the contact management service 102 may track the frequency of communication between the user and each of the user's contacts during any period of time.

Additionally or alternatively, in a further embodiment, the identified subset of user contacts can be associated with a special rate plan offered by a telecommunications carrier providing communication services to the telecommunications device 112. Specifically, the user may be provided a special rate associated with any communications made between the user and any of the contacts identified in the subset. In addition to a special rate, the rate plan may have a variety of other parameters that may affect selection of the contacts to be included in the subset. For example, in one embodiment, the subset of contacts may be limited in number to correspond to a number of contacts with whom communications will be provided at a special rate. As another example, the subset of contacts may be editable only after a specified period of time has elapsed from initial selection (whether by the user or partially by automated selection based on other factors such as frequency of communication information).

With continued reference to FIG. 3, at block 304, a test is performed by the contact management service 102 to determine whether context information should be used to determine at least two groups of contacts from the identified subset of user contacts. Generally described, context information can correspond to information that is published, or otherwise made available, about events associated with the telecommunications device user, any one or more of the user's contacts, the telecommunications environment 100, or any combination thereof. By way of example, context information as used in determining contact groups includes, but is not limited to, location, time of day, individual travel designations (e.g., stationary, moving, velocity, heading, etc.), manual designations (e.g., location, status, mood, etc.), cost information (e.g., rate plans, location), and the like. Additionally, context information may be expressly published by an identified entity, or on behalf of such an entity, or determined by reference to various information sources, such as calendaring information, location information, etc.

If, at block 304, the contact management service 102 determines that context information should take into consideration in the creation of contact groups, the contact management service 102 determines at least two contact groups from the identified subset of user contacts based on context information at block 306. In one embodiment, the contact management service 102 uses a context of the user of the telecommunications device and a plurality of user communication events associated with the context to determine contact groups. For example, the contact management service 102 may determine that any user contacts from the identified subset and with whom the user communicates using the user's telecommunications device at a particular geographic location, such as the user's place of employment, should be associated to form a first contact group, such as a work contact group. In another example, the contact management service 102 may determine that any user contacts from the identified subset and with whom the user communicates during particular times and dates, such as from 8 a.m. to 9 a.m. and 5 p.m. to 6 p.m. on Mondays through Fridays, should be associated to form a second contact group, such as a commuting contact group. In addition or alternatively, in another embodiment, the contact management service 102 uses a context of the user's contacts from the identified subset to determine a contact group. For example, the contact management service 102 may determine that two or more of the user's contacts are located in a single geographic region from 1 p.m. to 5 p.m. on Saturdays and that these user contacts should thus be associated to form a third contact group, such as a basketball contact group. In yet another example, the context information can include user preference information indicating preferred contacts for the user such as based on overall frequency of communication. The contact management service 102 may determine that these contacts form a V.I.P. contact group.

In one illustrative embodiment, the contact management service 102 may determine at least two contact groups based on context information such that each user contact from the subset may only belong to a single contact group. Alternatively, a user contact may be allowed to belong to more than one contact group. For example, while a spouse may be a member of a family contact group based on context information, the user may regularly communicate with the spouse at work and thus the spouse may also be a member of a work contact group based on other context information.

In another illustrative embodiment, the contact management service 102 may also determine an identifier for each determined contact group. In one embodiment, the contact group identifier may be determined based on context information associated with the corresponding group. For example, the context information may include information published or otherwise made available about members of the contact group, such as a subject line of calendar information for each of the members indicating that from 1 p.m. to 5 p.m. on Saturdays the contacts are at a basketball game. Accordingly, this contact group may be associated with a basketball identifier. In some embodiments, a user may be able to edit identifiers which were previously automatically determined by the contact management service 102. Alternatively, a user may provide the identifiers. In this embodiment, the contact management service 102 is configured to associate an identifier with each determined contact group, but requires user input to provide the specific corresponding identifier. The contact management service 102 may accordingly request such user input upon generation of the contact groups. In yet another embodiment, the contact management service 102 can associate a priority to the determined contact group based on preferences identified in or associated with the context information.

In a still further illustrative embodiment, the contact groups may be predetermined based on context information and maintained in the data store 110 (FIG. 1). For example, contact groups may be determined as part of an off-line process that is scheduled by the content management service 102. In another example, the contact management service 102 may store information associated with the formation of contact groups formed during previous iterations of routine 300. Accordingly, the determination of contact groups based on context information by the contact management service 102 relates to recalling and processing the predetermined data. Alternatively, the contact management service 102, or other component or service, may dynamically determine the contact groups based on the currently available context information at the time routine 300 is being implemented.

With continued reference to FIG. 3, after the contact management service 102 determines at least two contact groups from the identified subset based on context information, processing continues at block 312 as will be explained further below. Returning to block 304, if the contact management service 102 alternatively determines that context information is not to be used to determine contact groups from the identified subset, processing continues at block 308. Specifically, in this embodiment, the contact management service 102 determines at least two contact groups without the use of context information at block 308. For example, the contact groups may be user selected. A variety of methodologies may be utilized to present users of a telecommunications device 112 with contact groups for selection. Illustrative user interfaces for facilitating user selection of contact groups are provided in FIGS. 4A and 4B. In an illustrative embodiment, the selection of a contact group by a user of the telecommunications device 112 may be achieved utilizing a variety of input methods and hardware or software components in the telecommunications device 112. Examples include, but are not limited to, touch screen interfaces, specialized keys, stylus or other input devices, software based menus, voice commands, and the like. In a further illustrative embodiment, a number of contact groups may be made available for user selection. Such available contact groups may be predetermined or otherwise statically determined and maintained in the data store 110 (FIG. 1). In addition or alternatively, the user may create new personalized contact groups associated with a subset of contacts.

In yet another embodiment, the contact management service 102 can determine at least two contact groups from the subset of user contacts based on other user-created groups of contacts. Such user-created groups may include contacts other than those included in the subset of user contacts currently being processed. For example, a user may have previously created groups of work contacts, school contacts, and family contacts. Additionally, the subset of user contacts currently being processed may correspond to a group of favorite contacts. In this example, there may be additional contacts in each of the work, school, and family contact groups that are not included in the user's favorites contact group. Nonetheless, the contact management service 102 may use these other user-created work, school, and family contacts to determine contact groups from the favorite contacts subset. For example, a portion of the contacts in the favorite contacts subset may also belong to the user-created work contact group. Accordingly, the contact management service 102 may determine a first contact group from the favorite contacts subset to be a "favorite work" contact group based on the intersection of members between the favorite contacts subset and the user-created work contact group.

Next, at block 310, the contact management service 102 optionally predetermines context information for association with each of the at least two contact groups select by a user of the telecommunications device 112. As similarly, set forth above, the context information can correspond to information that is published, or otherwise made available, about events associated with the telecommunications device user, any one or more of the user's contacts, the telecommunications environment 100, or any combination thereof. By way of example, context information as used in determining contact groups includes, but is not limited to, location, time of day, individual travel designations (e.g., stationary, moving, velocity, heading, etc.), manual designations (e.g., location, status, mood, etc.), cost information (e.g., rate plans, location), and the like. In an illustrative embodiment, the context information associated with the contact group may be a selected from the same context information that is available in the formation of contact groups. Alternatively, the contact management service 102 may limit, or otherwise specify, context information that can be associated with a determined contact group.

In one embodiment, the contact management service 102 uses context information associated with the telecommunications device user and/or the members of each user-selected contact group to determine a context associated with the respective contact group. For example, the contact management service 102 may determine that the telecommunications device user always communications with user contacts in a "work" contact group while the user is at a particular geographic location, such as the user's place of employment. The contact management service 102 may thus associate this geographic location with the "work" contact group. In another example, the contact management service 102 may determine that the telecommunications device user always communicates with user contacts in a "commuting" contact group during particular times and dates, such as from 8 a.m. to 9 a.m. and 5 p.m. to 6 p.m. on Mondays through Fridays. The contact management service 102 may thus associate this time and date information with the "commuting" contact group. As another example, the contact management service 102 may determine that user contacts in a "basketball" contact group are all located in a single geographic region from 1 p.m. to 5 p.m. on Saturdays. The contact management service 102 may thus associate this location, day of the week, and time information with the "basketball" contact group.

In another embodiment, the contact management service 102 may identify a context for association with each contact group based on manual determination of the context associated with the formed content group. A variety of methodologies may be utilized to present users of a telecommunications device 112 with context information for selection and association with a particular contact group. Additionally, the selection and association of a context with a particular contact group by a user of the telecommunications device 112 may be achieved utilizing a variety of input methods and hardware or software components in the telecommunications device 112. In one illustrative embodiment, the telecommunications device user may generate a user interface for allowing a user to input, or otherwise select, a context, to be associated with a particular contact group. Additionally, the communication management service 102 may provide a telecommunications device user with the ability to edit dynamically determined context information, to modify the context information, or otherwise add/remove context information.

In yet another embodiment, rather than the contact management service 102 automatically determining a context associated with each of the contact groups based on context information and rather than providing for user selection of the context, a context may be predefined as being associated with a particular contact group. For example, a work contact group may be predefined as being associated with a geographic location corresponding to the telecommunications device user's place of employment. As also further explained below, one skilled in the relevant art will appreciate that block 310 may be omitted altogether or partially implemented in accordance with user preferences for example.

With continued reference to FIG. 3, after determination of at least two contact groups associated with a subset of user contacts via either block 306 or block 308 and optional block 310, the contact management service 102 generates a contact display based on a current context of the telecommunications device user at block 312. More particularly, the contact management service 102 selects a first contact group from the at least two contact groups for display in the contact display based on a current context of the telecommunications device user. Accordingly, the contact management service 102 first determines a current context associated with the user of the telecommunications device. Examples of context information have been previously provided. After identifying the user's current context, the contact management service 102 determines whether the user's current context corresponds to a context associated with any of the at least two contact groups. Continuing with the foregoing example, the contact management service 102 may correlate the "Work" contact group with the user's current context since the "Work" contact group is associated with context information about contacts the user communicates with while at work. Given that the user is now located at work, the contact management service 102 determines that the "Work" contact group should be displayed to the user.

While the contact management service 102 may compare the user's current context with context information previously associated with each of the contact groups, the contact management service 102 may also dynamically determine context information associated with each of the contact groups for comparison with the user's current context. For example, the contact management service 102 may determine that the user is currently located at a park. The contact management service 102 may then dynamically determine that user contacts in a "family" contact group are also located in the park or are on their way to the park. This context information may not be previously associated with the "family" contact group as the picnic may be a recently planned event. The contact management service 102 may thus dynamically determine that the "family" contact group corresponds to the user's current context and generate a display in which the "family" contact group is presented to user based on the user's current context.

In some embodiments, more than one contact group may correspond to the user's current context. In this case, the contact management service 102 may prioritize the identified contact groups based on one or more additional criteria. Such criteria may be predetermined by the service 102 or provided by the user of the telecommunications device. In one example, location based context information may be prioritized over date and time based context information. In another example, user provided context information, such as an "at work" designation, may be prioritized over any real time context information.

After identifying a contact group based on a user's current context, the contact management service 102 generates a display in which the identified contact group is presented. Illustrative user interfaces for displaying a contact group from the subset of user contacts based on a user's current context are provided in FIGS. 5A-5B and FIG. 6B and will be described further below. In an illustrative embodiment, the contact management service 102 may generate a contact display in which only the identified contact group is presented. Alternatively, the contact display may include other contacts or contact groups, but the identified contact group based on the user's current context may be otherwise emphasized. For example, the identified contact group may be presented on the display with an associated contact group identifier, while other contacts or contact groups are not. In another example, the identified contact group may be more prominently displayed in comparison to other contacts or contact groups. In yet another example, each of the contacts in the identified contact group may be emphasized, such as through highlighting, increased dimensions of corresponding graphical identifiers, and the like, as compared to other displayed contacts or contact groups. After the contact management service 102 generates the contact display based on the user's current context, the routine 300 ends at block 314.

It will be appreciated by those skilled in the art and others that the determination at block 304 is optional in some embodiments. For example, the routine 300 may be implemented without determining members of each of the contact groups based on context information at block 306. Alternatively, the routine 300 may be implemented only where the contact groups are created based on context information and thus, in this case, blocks 308 and 310 may be omitted. It will also be appreciated by one skilled in the art and others that the functionality at block 310 may also be optional. For example, in some embodiments, the contact management service 102 alternatively dynamically determines context information associated with each contact groups.

Figure 4A:
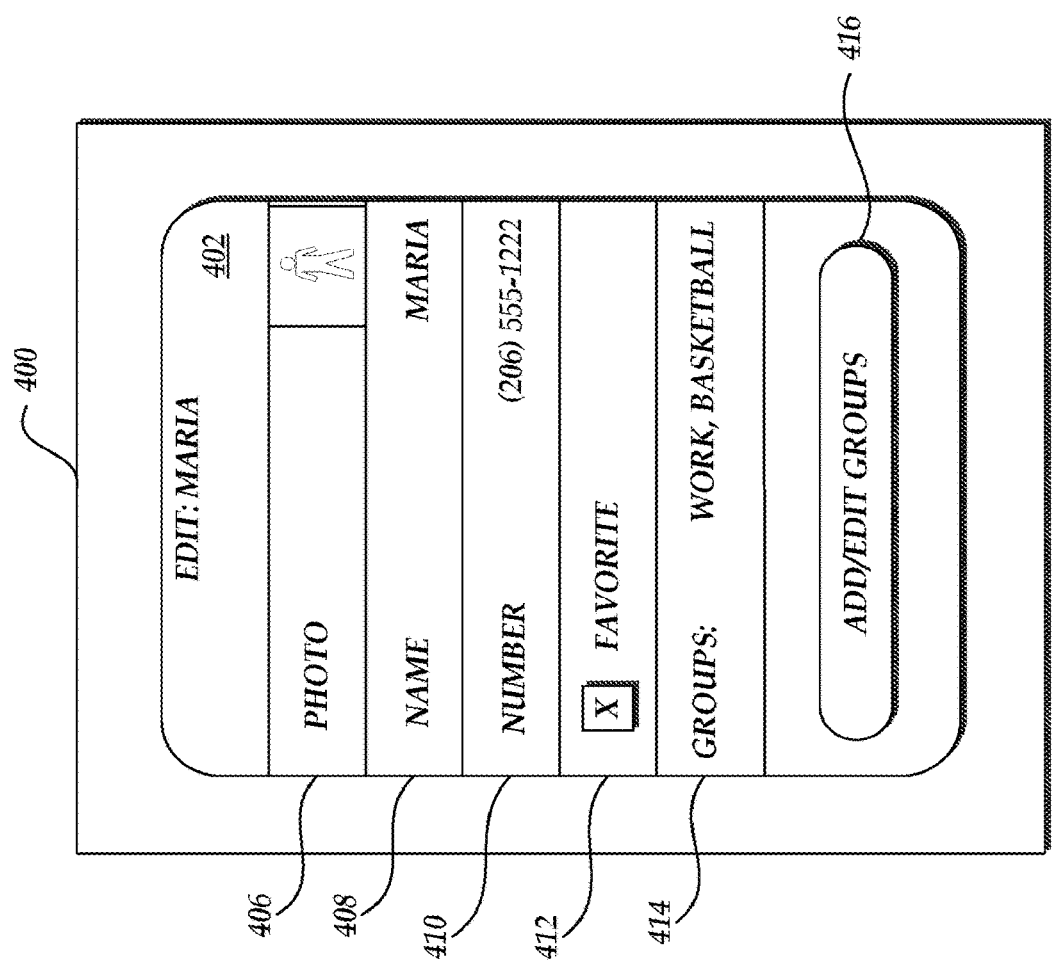
FIGS. 4A and 4B are illustrative user interfaces generated on a telecommunications device for presenting user contact information for editing.
Figure 4B:
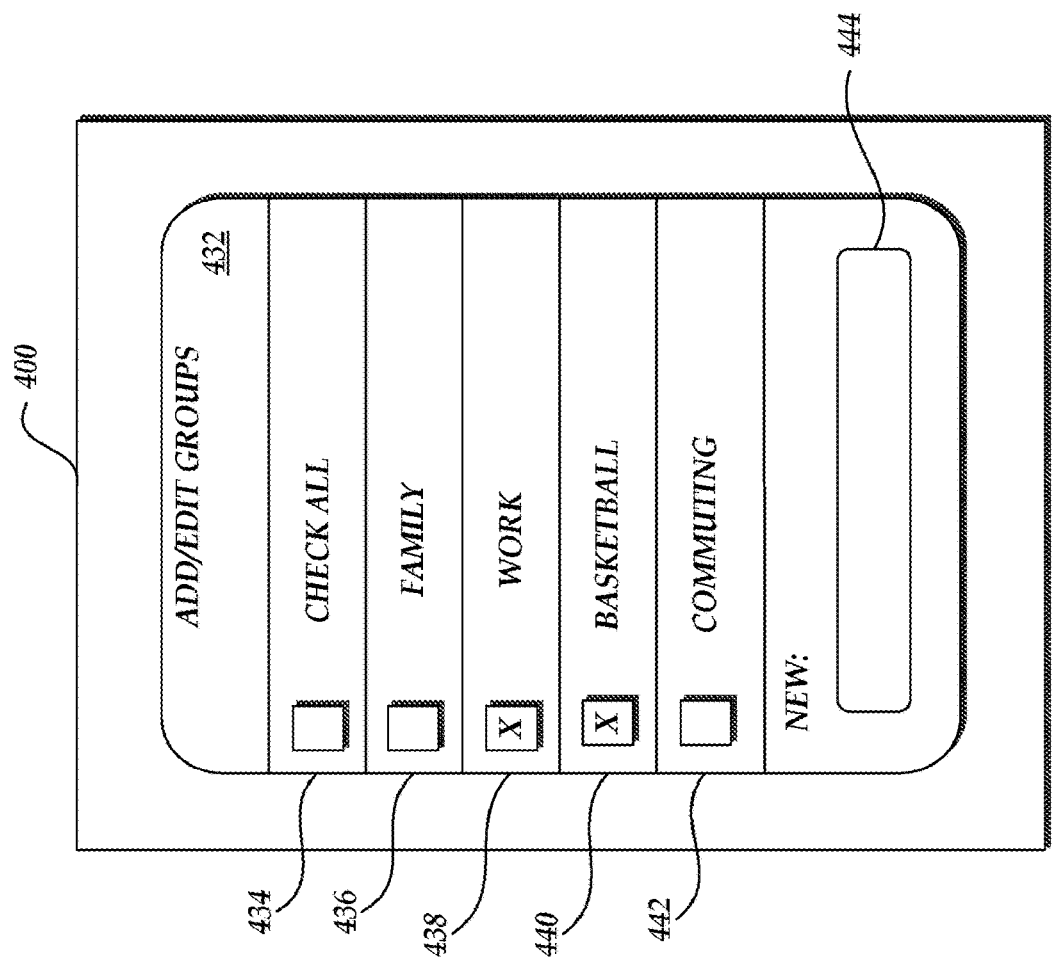

With reference now to FIGS. 4A-4B, illustrative user interfaces generated on a telecommunications device for presenting information associated with a user contact for editing will be described. The user interfaces illustrated in FIGS. 4A-4B correspond to displays generated on a display screen 400 corresponding to an output device 214 (FIG. 2). One skilled in the relevant art will appreciate that the screen displays are illustrative in nature and should not be construed as limiting.

With reference to FIG. 4A, one embodiment of a user interface generated on the telecommunications device 112 for facilitating user selection of contact groups will be described. In this embodiment, the user interface corresponds to a display screen 400 that includes a display 402 for displaying a contact information record associated with a first contact of the telecommunications device user. The contact information record includes a plurality of display objects 406, 408, 410 for identifying characteristics associated with the first contact, such as an image, a name, and a contact number, respectively. The contact information record further includes a display object 412 which identifies that the first contact as a member of a subset of contacts. In this example, the subset of contacts corresponds to a "favorites" subset of contacts. Display object 412 can also be selectable to add or remove the first contact as a member of the "favorites" subset. For contacts that are members of the "favorites" subset of contacts, the contact information record further includes a display object 414 which identifies contact groups to which the contact also belong. In this example, the first contact is associated with "work" and "basketball" contact groups. The contact information record also includes a display object 416 which is selectable for adding and/or otherwise editing the contact groups to which the first contact belongs.

With reference now to FIG. 4B, another embodiment of a user interface generated on the telecommunications device 112 for facilitating user selection of contact groups will be described. In this embodiment, the user interface corresponds to a display screen 400 that includes a display 432 provided in response to selection of the display object 416 in the display 402 of FIG. 4A for adding and/or otherwise editing the contact groups to which the first contact belongs. Display 432 in FIG. 4B provides various contact groups to which the first contact may belong. As shown in the illustrative embodiment in FIG. 4B, the contact groups can include a family contact group 436, a work contact group 438, a basketball contact group 440, and a commuting contact group 442. In accordance with the prior example, the first contact is currently identified as belonging to the "work" and "basketball" contact groups. Each of the contact groups identified in the display 432 can be selected to include the first contact as a member or deselected to remove the first contact as a member of the respective contact group. The display 432 also includes a display object 434 for selecting the first contact to be a member of all contact groups associated with the "favorites" subset of contacts. Additionally, the display 432 includes a display object 444 for facilitating the creation of a new contact group by the user of the telecommunications device 112.

Figure 5A:
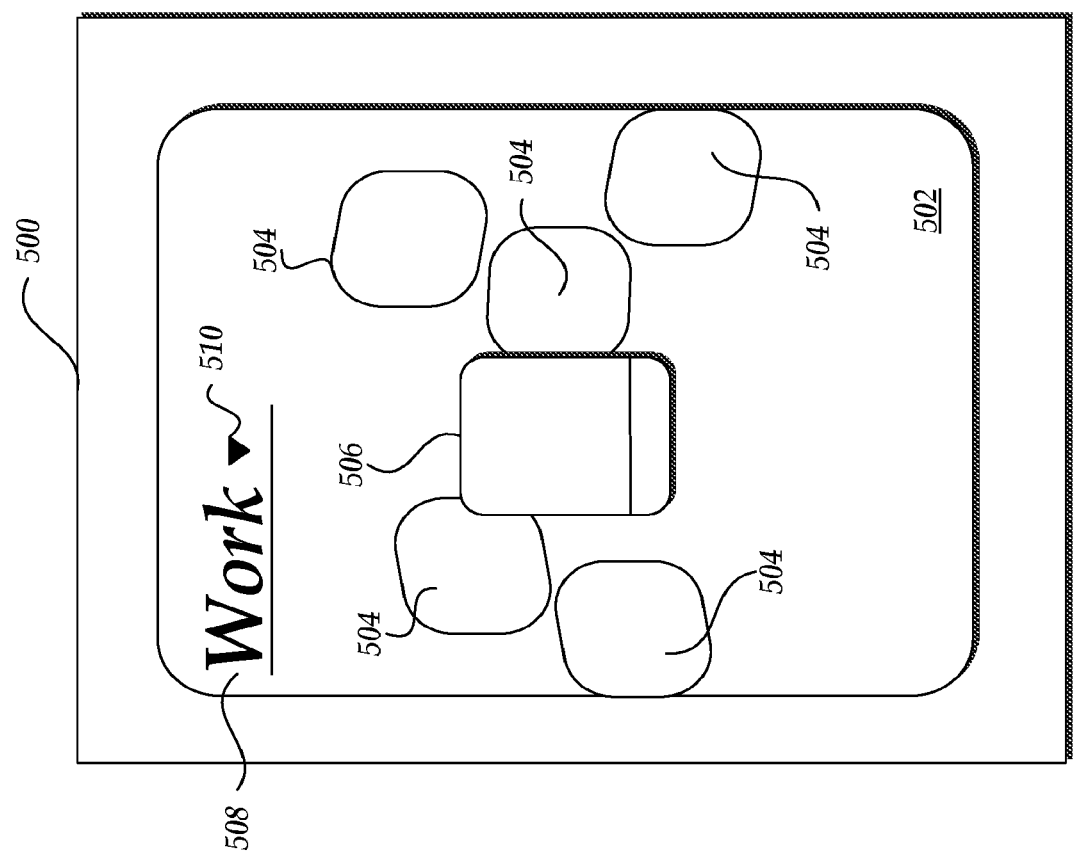
FIGS. 5A and 5B are illustrative user interfaces generated on a telecommunications device for presenting a group of contacts from the subset of user contacts based on a current context of the telecommunications device user.
Figure 5B:
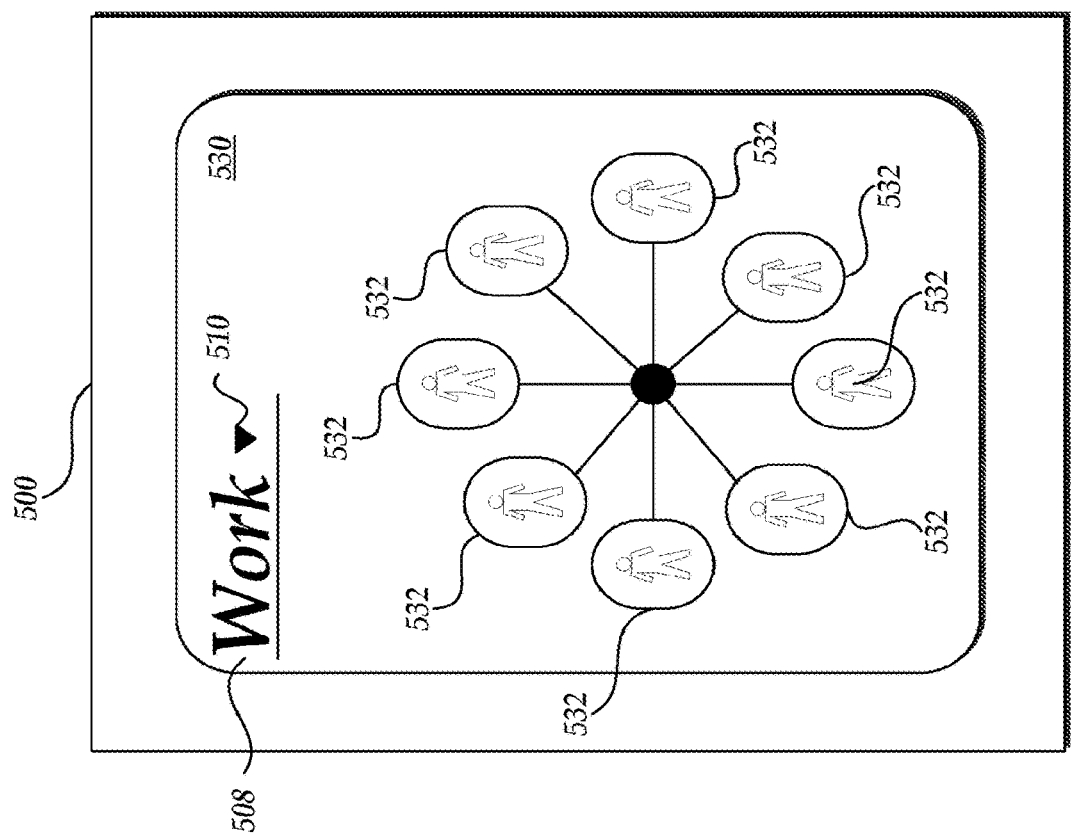

With reference now to FIGS. 5A-5B, illustrative user interfaces generated on a telecommunication device for presenting a first contact group based on a current context of a user of the telecommunications device will be described. One skilled in the relevant art will appreciate that the screen displays are illustrative in nature and should not be construed as limiting. With reference to FIG. 5A, one embodiment of a user interface generated on the telecommunications device 112 for presenting a first contact group based on a current context of a user and for facilitating the selection of contacts associated with the first contact group will be described. In this embodiment, a display screen 500 includes a first portion 502 for displaying movement of a set of graphical identifiers about an axis external to the telecommunications device 112. The graphical identifiers can be considered display objects 504 in which each display object corresponds to a specific contact. In this embodiment, the display objects 504 correspond to contacts that are members of a first contact group associated with a subset of user contacts. For example, the subset of user contacts may have been identified by the user as "favorites" or may be associated with a special service provider rate plan. In this example, the first contact group from this subset determined based on a user's current context is a "work" contact group. As the rotation of the display objects 504 is emulated, one display object is manipulated to be the focal point of the interface, as illustrated on display object 506. Accordingly, the user can select the contact associated with the focal point display object 506. The first portion 502 of the display screen 500 further includes a display object 508 corresponding to contact group identifier (e.g., a "Work" identifier). Additionally, a control 510 is further presented in the display screen 500 and can be manipulated to identify and select other contact groups from the subset of user contacts for display. Depending on the capabilities of the telecommunication device 112, other display objects may also be selectable.

With reference to FIG. 5B, another embodiment of a user interface generated on the telecommunications device 112 for presenting a first contact group based on a current context of a user and for facilitating the selection of contacts associated with the first contact group will be described. In this embodiment, a display screen 500 includes a first portion 530 for displaying movement of a set of graphical identifiers about an axis. The graphical identifiers can be considered display objects 532 in which each display object corresponds to a specific contact. In this embodiment, the display objects 532 correspond to contacts that are members of a first contact group associated with a subset of user contacts. For example, the subset of user contacts may have been identified by the user as "favorites" or may be associated with a special service provider rate plan. In this example, the first contact group from this subset determined based on a user's current context is a "work" contact group. As the rotation of the display objects 532 is emulated, a user can select any of the display objects 532. Alternatively, the size and formatting of one or more of the display objects 632 may also be varied to facilitate focus on a particular display object 632. The first portion 530 of the display screen 500 further includes a display object 508 corresponding to contact group identifier (e.g., a "Work" identifier). Additionally, a control 510 is further presented in the display screen 500 and can be manipulated to identify and select other contact groups from the subset of user contacts for display.

Depending on the capabilities of the telecommunication device 112, other display objects may also be selectable.

Figure 6A:
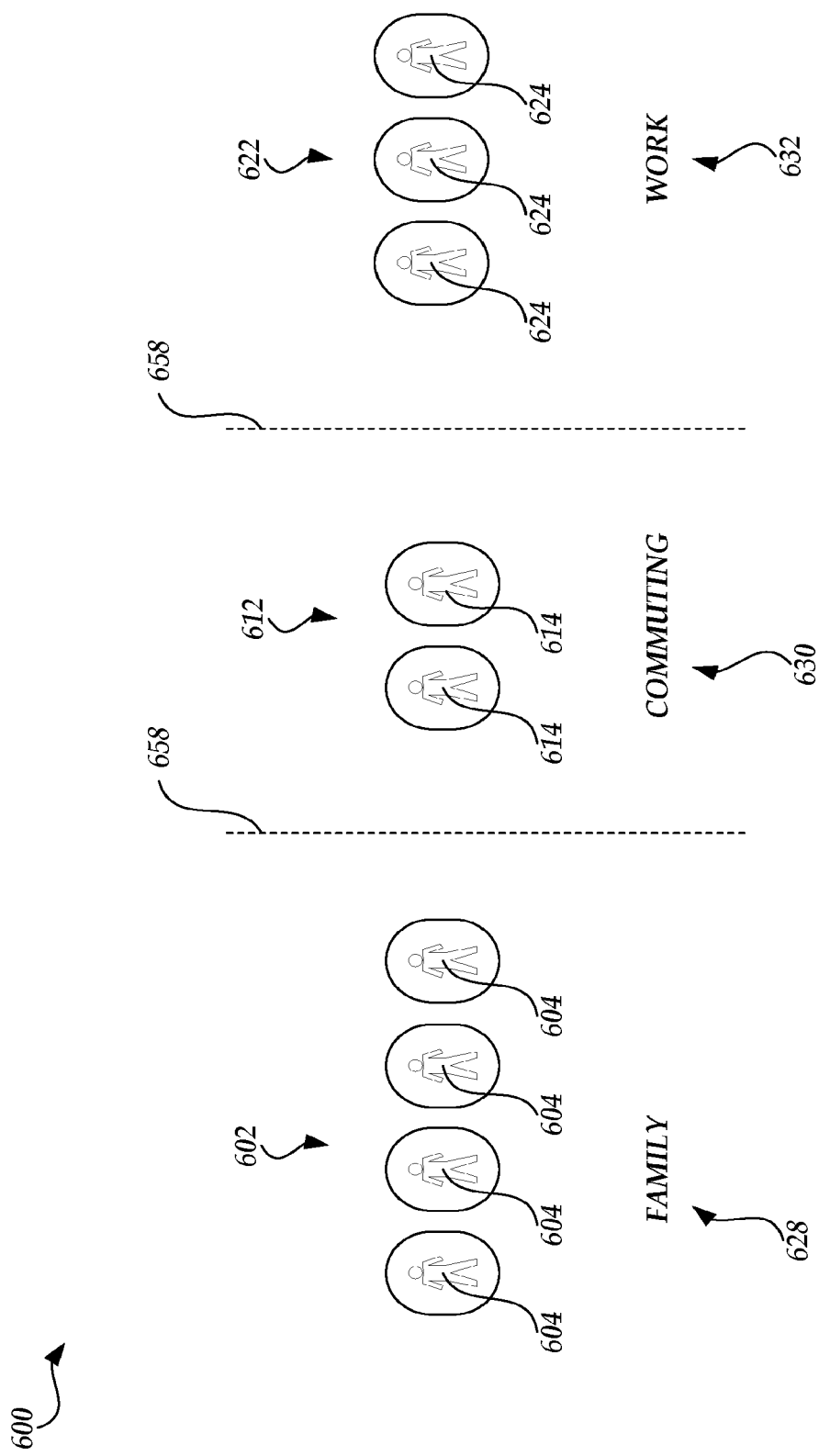
FIG. 6A is a diagram illustrating a logical association of contacts into a plurality of contact groups.
Figure 6B:
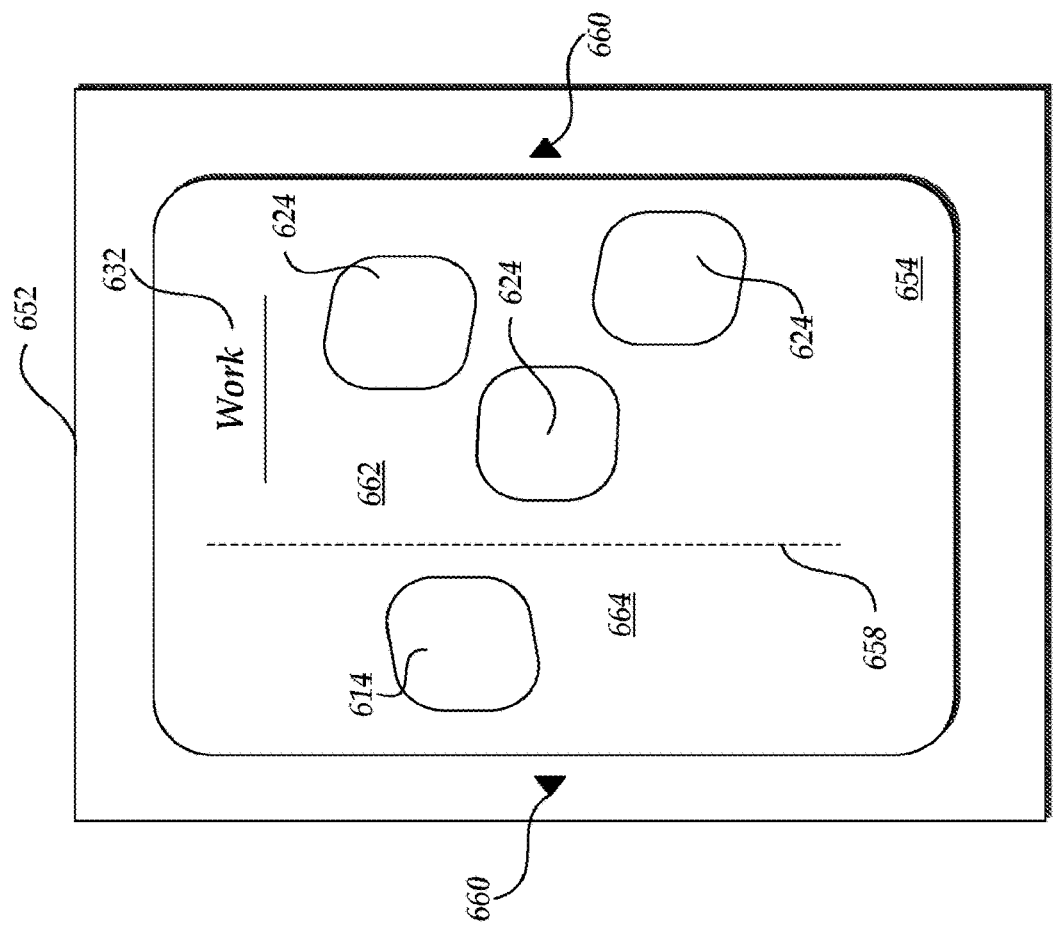
FIG. 6B is another embodiment of an illustrative user interface generated on a telecommunications device for presenting a group of contacts from the subset of user contacts based on a current context of the telecommunications device user.

With reference now to FIGS. 6A-6B, yet another embodiment of an illustrative user interface generated on a telecommunication device for presenting a first contact group based on a current context of a user of the telecommunications device will be described. In particular, in this embodiment, as will be described further below, the illustrative user interface as shown in FIG. 6B presents a first contact group based on a current context of a user. Additionally, the user interface also displays one or more contacts not included in the first contact group. One skilled in the relevant art will appreciate that the screen display as shown in FIG. 6B is illustrative in nature and should not be construed as limiting.

With reference to FIG. 6A, a diagram 600 illustrating a logical association of contacts into a plurality of contact groups will first be described. The diagram 600 illustrates a subset of user contacts 604, 614, 624. These contacts 604, 614, 624 are further distinguished by a plurality of contact groups 602, 612, 622. In particular, contacts 604 are associated with a first contact group 602. In this example, the first contact group is a "family" contact group and is thus associated with "Family" contact group identifier 628. Contacts 612 are associated with a second contact group 612. In this example, the second contact group is a "commuting" contact group and is thus associated with "Commuting" contact group identifier 630. Finally, contacts 622 are associated with a third contact group 622. In this example, the third contact group is a "work" contact group and is thus associated with "Work" contact group identifier 632. The diagram 600 also includes a number of contact group dividers 658 for logically identifying and further displaying how the contacts 604, 630, 632 are divided into contact groups. Accordingly, a first of the dividers 658 separates the "Family" contacts 604 from the "Commuting" contacts 614, while a second of the dividers 658 separates the "Commuting" contacts 614 from the "Work" contacts 624. As similarly mentioned above, an individual contact may belong to more than one contact group. Alternatively, each contact may be limited to inclusion in a single contact group.

With reference to FIG. 6B, another embodiment of a user interface generated on the telecommunications device 112 for presenting a first contact group based on a current context of a user will be described. In this embodiment, a display screen 652 includes a first portion 654 for displaying movement of a set of graphical identifiers about an axis external to the telecommunications device 112. The graphical identifiers can be considered display objects 614, 624 in which each display object corresponds to a specific contact. In this embodiment, the display screen 652 presents a contact group identified based on a current context of a user in a second portion 662 of the display. Additionally, the identified contact group is displayed with an associated identifier 622. Continuing with the prior example discussed above with respect to FIG. 6A, the identified contact group may be a "Work" contact group. Accordingly, contacts 624 from the "Work" contact group 622 are displayed on the display screen 652 in FIG. 6B with a "Work" identifier 632.

In one embodiment, while the "Work" contact group is identified and displayed based on the user's current context, other contacts from different contact groups may be simultaneously presented on the display screen 652. Accordingly, the "Work" contact group may be presented to a user of the telecommunications device as the contact group of relevance (i.e., the contact group identified based on the user's current context) in accordance with a number of methodologies, such as by providing a contact group identifier for only the identified contact group, prominently displaying only contacts from the identified contact group, providing any other emphasis for only those contacts in the identified contact group, and the like. In the current example, while one of the contacts 614 from the "Commuting" contact group (FIG. 6A) is presented in another portion 664 of the display screen 652, the identified contact group (i.e., the "Work" contact group) is associated with a "Work" contact group identifier 632 to provide the user with an indication that the "Work" contact group is the contact group selected based on the user's current context. Additionally, controls 660 are further presented in the display screen 652 and can be manipulated to emulate rotation of the contact groups in order to identify and select other contacts from different contact groups. The display screen 652 further includes divider display objects 658 for delineation between contacts in different contact groups. The divider display objects 658 also emulate rotation together with the contacts about the axis external to the display.

Figure 7A:
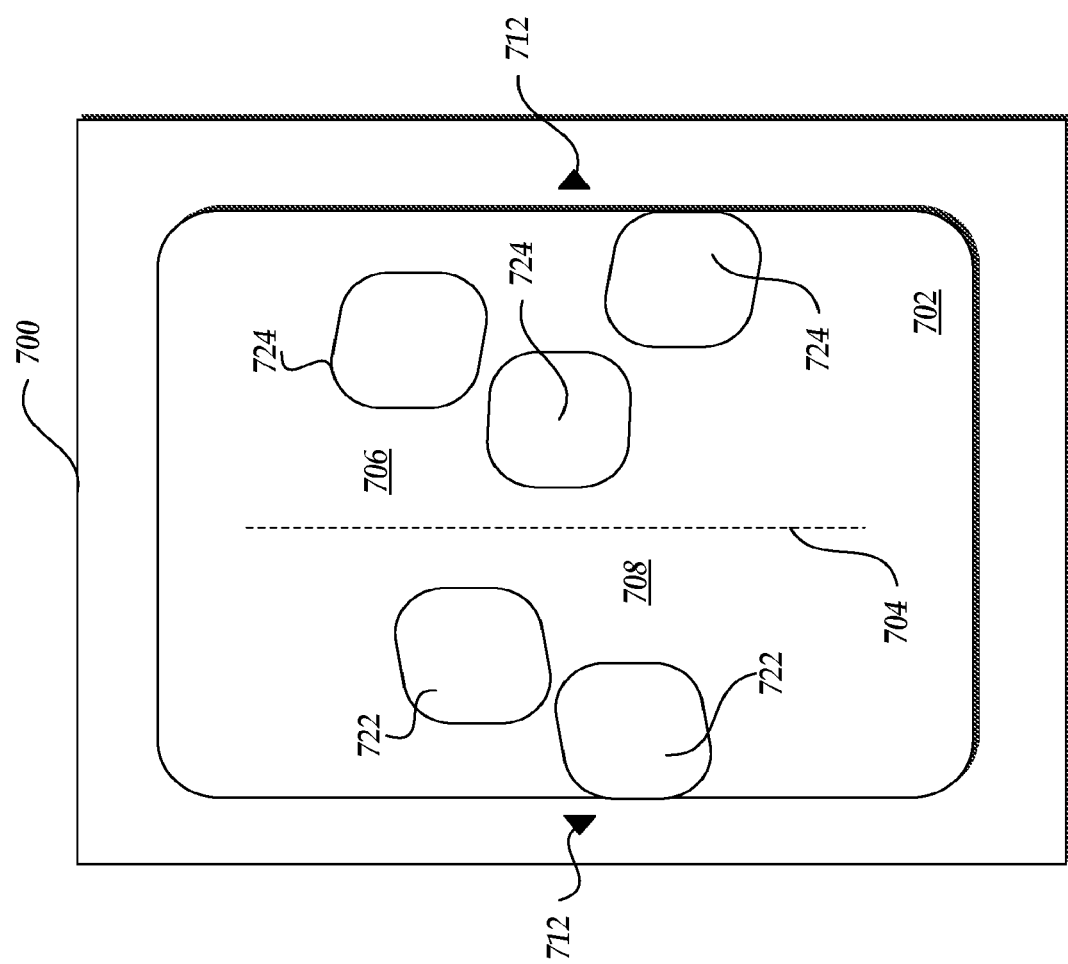
FIG. 7A is an illustrative user interface generated on a telecommunications device for presenting contacts from the subset of user contacts with one or more divider display objects.
Figure 7B:
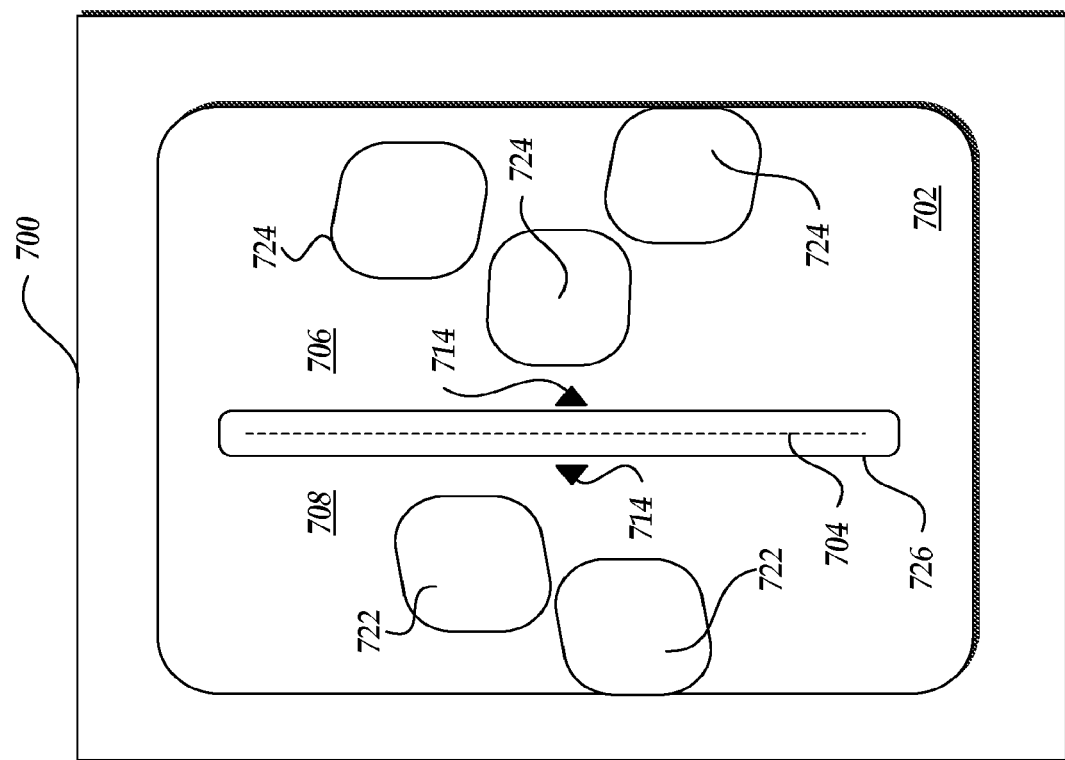
FIG. 7B is an illustrative user interface generated on a telecommunications device for creating and/or modifying contact groups using at least one divider display object.

With reference now to FIGS. 7A-7B, illustrative user interfaces generated on a telecommunication device for presenting contacts included in a subset of contacts with one or more divider display objects will be described. In particular, in one embodiment, as will be described further below, contacts groups formed from the subset of user contacts in any manner can be displayed in a user interface with divider display objects to delineate one contact group from another. Additionally, in another embodiment, the contact groups may be created using divider display objects. One skilled in the relevant art will appreciate that the screen displays presented in FIGS. 7A-7B are illustrative in nature and should not be construed as limiting.

With reference now to FIG. 7A, one embodiment of a user interface generated on the telecommunications device 112 for presenting contact groups formed from a subset of user contacts will be described. This embodiment is virtually identical to the user interface described in reference to FIG. 6B with a few exceptions. First, the embodiments associated with the user interfaces depicted in FIGS. 7A-7B do not require that the contact groups be selected based on context information. Instead, the contact groups may be formed in any manner. Moreover, as will be described further in reference to FIG. 7B, the contact groups may be formed by a user by adding divider display objects between contacts on a display. Additionally, the contact groups may be modified by a user by moving divider display objects between different contacts on the display. Second, the displays presented in the illustrative user interfaces depicted in FIGS. 7A-7B are not generated in response to or based on a user's current context. Instead, the user interfaces may be presented to a user at any time. In one embodiment, the user interfaces may be presented automatically on a home page, a start screen, or an idle screen; upon selection by a user of the telecommunications device; and the like.

With further reference to FIG. 7A, in one embodiment, a display screen 700 includes a first portion 702 for displaying movement of a set of graphical identifiers about an axis external to the telecommunications device 112. The graphical identifiers can be considered display objects 722 and 724 in which each display object corresponds to a specific contact. In this embodiment, the display screen 700 further includes at least one divider display object 704 for delineation between contacts in different contact groups. Specifically, in the example illustrated in FIG. 7A, the divider display object 704 partitions display objects 722 from display objects 724. Accordingly, display objects 722 are included in a first contact group, while display objects 724 are included a second contact group. In one embodiment, the at least one divider display object 704 can also be moveable together with the contacts to emulate rotation about the axis external to the display. Accordingly, additional contacts from the subset of contacts and/or additional divider display objects (and thus additional contact groups) may come into view on the display screen 700 in response to a number of various different types of user inputs. For example, in one illustrative embodiment, controls 712 are presented in the display screen 700 and can be manipulated to emulate rotation of the contact groups and divider display objects in order to identify and select other contacts from different contact groups.

With reference now to FIG. 7B, one embodiment of a user interface generated on the telecommunications device 112 for creating and/or modifying contact groups using divider display objects will be described. The user interface depicted in FIG. 7B is virtually identical to the user interface described in reference to FIG. 7A with a few exceptions. First, the divider display object 704 is selected as indicated by a selection display object 726. The divider display object 704 may be selected in a number of ways to cause the divider display object to be presented together with the selection display object on the display screen 700. As set forth above, display objects, including the divider display object 704, may be selectable by a user via any one of a variety of input methods and devices. Examples include, but are not limited to, touch screen interfaces, specialized keys, stylus or other input devices, software based menus, voice commands, and the like. In one embodiment, the divider display object 704 may be selectable by a user in such a way that a divider display object is added to the display screen 700 where there was previously no divider display object, such as in response to an add divider input. In another embodiment, a user may select a divider display object already presented on the display screen 700, such as by touching a displayed divider display object 704, to modify the contact groups delineated by the divider display objects. The user interface depicted in FIG. 7B is illustrative of a display screen 700 which may be presented to a user of the telecommunication device in response to any of the foregoing described selection inputs associated with the divider display object.

As further illustrated in FIG. 7B, in one embodiment, the display screen 700 may also include controls 714 which can be manipulated by a user to cause the divider display object 704 to be positioned between different contacts on the display. In this way, contact groups may be modified based on the repositioning of the divider display object between different contacts from the subset of user contacts. In one embodiment, manipulation of the controls may cause the divider display object to move on the display screen 700 relative to the displayed contacts in the subset of contacts. In addition or alternatively, manipulation of the controls may cause the display objects associated with the contacts to move on the display relative to the divider display object 704. In either case or combination, as controls 714 are manipulated, other contacts in the subset of user contacts and/or other divider display objects may be presented on the display, while some of the previously presented contacts and/or divider display objects may appear to rotate off the display screen 700. Once the divider display object 704 is repositioned, the new contact groups are formed.

In another embodiment, the display objects 722, 724 which are associated with the user contacts may be individually selectable and moveable to reposition the selected display object in a different contact group. In this embodiment, movement of a display object from the portion 706 on the display screen 700 (on the right side of the divider display object 704), for example, to the portion 708 on the display screen 700 (on the left side of the divider display object) causes the moved display object to become a member of a different contact group.

In yet another embodiment, contact groups, at least a part of which are displayed in the display screen 700, may be modified based on deleting a divider display object 704. In one example, selection of the divider display object 704 illustrated in FIG. 7B may facilitate selection of additional actions, such as a delete divider action, provided by a user of the telecommunications device.

In a still further embodiment, upon addition of a first divider display object between contacts in the subset, the contact management service 102 may automatically generate one or more additional dividers to further define the group, or groups, formed by the insertion of the first divider display object. Specifically, the contact management service 102 can automatically generate a start divider display object, an end divider display object, or both in addition to the requested divider display object. This embodiment may be particularly applicable to embodiments in which the subset of contacts emulate rotation about an axis external to the telecommunications device display. By way of example, assume the contact management service 102 displays a subset of contacts that emulate rotation about an axis. In one aspect, the user may want to be able to visually distinguish between the first and last contact in the subset (or a start and an end of the subset). Accordingly, the contact management service 102 can automatically add a display object (e.g., a start or end divider) adjacent to contacts in a first and/or last logical position, respectively, in the subset. Accordingly, in the embodiment in which the subset of contacts emulate rotation about the external axis, the start and/or end divider display object provides the user with an indication that the user has cycled through to the first and/or last contact in the subset.

In one embodiment, start and/or end divider display objects may be automatically generated and displayed in response to a user's request to add a first divider display object. In another embodiment, the contact management service 102 may always initially generate a start and/or end divider display object for display with the subset of contacts without requiring user input.

In yet another embodiment, the contact management service 102 may provide additional functionality so that a user can cause the display to scroll immediately to the next divider positioned between contacts. In particular, the contact management service 102 may be able to immediately cause a next divider display object (previously positioned between contacts) and at least one contact adjacent to the next divider display object to be presented on the telecommunications device display in response to a user input. In this way, rather than displaying each contact from the subset in sequence via emulated rotation of the contacts, the contact management service 102 can bypass display of select contacts in the sequence (and which are not currently of interest to the user) by immediately advancing the display to a next divider display object in response to a user input. Accordingly, the contact management service 102 can advance the contacts displayed in increments defined by the positioning of the divider display objects.

In any of the foregoing embodiments, rather than the display objects 722, 724 corresponding exclusively to contacts from a subset of contacts, the display objects 722, 724 can correspond to individual contacts, groups of contacts each represented by a single graphical identifier, applications, other executable components, or any combination thereof, determined from a larger set. For example, instead of creating contact groups within a user's favorite set of contacts (which is a subset of all of the user's contacts), a user may create a favorite set of applications or a favorite set of executable components from which groups may be created, modified, and displayed using the divider display object 704 as described above.

Additionally, rather than being exclusively applicable to user contacts, any of the other foregoing embodiments, such as those described in reference to FIGS. 3-6B, may be equally applicable to individual contacts, groups of contacts each represented by a single graphical identifier, applications, other executable components, or any combination thereof, determined from a larger set.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method comprising:
identifying a subset of executable components associated with a user of a telecommunications device, wherein the subset of executable components includes a portion of executable components accessible by the telecommunications device;
determining first and second executable component groups from the subset of executable components;
causing the generation of a first display on the telecommunications device, wherein the first display includes a first representation of at least a portion of the first or second executable component groups and a divider display object, wherein the divider display object is positioned adjacent to at least one executable component displayed in the first representation, wherein the divider display object partitions the first executable component group from the second executable component group, and wherein the divider display object is identified on the first display as adjustable to modify positioning of the divider display object relative to the executable components in the first and second executable component groups;
obtaining at least one modification input associated with the divider display object for repositioning the divider display object;
causing the generation of a second display on the telecommunications device, wherein the second display includes a second representation of at least a portion of the subset of executable components and the divider display object, wherein the divider display object in the second representation is repositioned based on the at least one modification input, and wherein the divider display object in the second representation is repositioned adjacent to at least one different executable component in the second display as compared to the first display; and
modifying members of the first and second executable component groups based on the at least one modification input;
wherein the method is implemented in a computer system.

2. The method as recited in claim 1, wherein the second executable component group does not have any contacts in common with the first executable component group.

3. The method as recited in claim 1, wherein executable components displayed in the second representation are repositioned to prevent intersection with the divider display object.

4. The method as recited in claim 1, wherein determining first and second executable component groups from the subset of executable components includes identifying an add divider input initiated by the user of the telecommunications device.

5. The method as recited in claim 4, wherein the add divider input includes a touch screen input, wherein the touch screen input identifies a location between two executable components in the subset of executable components.

6. The method as recited in claim 1, wherein determining the first executable component group from the subset of executable components includes receiving at least one user input selecting one or more executable components from the subset as members of the first executable component group.

7. The method as recited in claim 6, wherein the second executable component group is determined based on executable components not included in the first executable component group.

8. The method as recited in claim 6, wherein determining the second executable component group from the subset of executable components includes receiving at least one user input selecting one or more executable components from the subset as members of the second executable component group.

9. The method as recited in claim 1, wherein the at least a portion of the subset of executable components and the divider display object in the first representation are rotatable about an axis.

10. The method as recited in claim 1, wherein modifying members of the first and second executable component groups based on the at least one modification input comprises determining, for each of the first executable component group and the second executable component group, a second set of members from among the subset of executable components, wherein the second set of members is based at least in part on the modified positioning of the divider display object.

11. The method as recited in claim 1, wherein the at least one modification input includes user-selected movement of the divider display object on the display of the telecommunications device.

12. The method as recited in claim 1 further comprising:
obtaining a request to modify the first executable component group;
updating members of the first executable component group based on the modification request; and
causing the generation of a third display on the telecommunications device, wherein the third display includes a third representation of at least a portion of the subset of executable components and the divider display object, wherein the divider display object in the third representation is positioned adjacent to at least one executable component displayed in the third representation, and wherein the divider display object in the third representation partitions the updated first executable component group from the second executable component group.

13. The method as recited in claim 12, wherein the modification request includes user-selected movement of an executable component in the first contact group into a position in the second executable component group as delineated by the divider display object in the first display and wherein members of the second executable component group are updated based on the user-selected movement.

14. A system comprising:
a data store for maintaining subsets of executable components, wherein each subset of executable components is associated with a user of a telecommunications device; and
at least one computing device in communication with the data store, the at least one computing device configured to:
cause generation of a first display on the telecommunications device, wherein the first display includes a first representation of at least a portion of a subset of executable components;
determine a location for a first divider display object for partitioning the executable components from the subset of contacts to form at least two groups from the subset of executable components, wherein determining a location for the divider display object is based on an add divider request initiated by the user of the telecommunications device, wherein the add divider request identifies a location for the divider display object between two executable components represented on the display; and
responsive to determining the location for the divider display object,
determine a first set of members of each of the at least two executable component groups from the subset of executable components based at least in part on the location of the divider display object relative to the subset of executable components; and cause the generation of a second display on the telecommunications device, wherein the second display includes the divider display object and a second representation of at least a portion of the subset of executable components, wherein the divider display object is positioned adjacent to at least one executable component in the second representation, and wherein the divider display object is selectable to modify positioning of the divider display object relative to the subset of executable components in order to modify members of the at least two executable component groups from the subset of executable components.

15. The system as recited in claim 14, wherein executable components displayed in the second display are repositioned to prevent intersection with the divider display object.

16. The system as recited in claim 14, wherein the subset of executable components is selected at least in part by the user of the telecommunications device.

17. The system as recited in claim 14, wherein the add divider input includes a touch screen input, wherein the touch screen input identifies the location between two executable components represented on the display.

18. The system as recited in claim 14, wherein the first representation and the second representation include the same executable components from the subset of executable components.

19. The system as recited in claim 14, wherein at least one executable component in the first representation is different from the executable components in the second representation.

20. The system as recited in claim 14, wherein the at least one computing device is further configured to:
obtain at least one modification input associated with the first divider display object for modifying the positioning of the first divider display object; and
cause generation of a third display on the telecommunications device, wherein the third display includes the divider display object and a third representation of at least a portion of the subset of executable components, wherein the divider display object is repositioned based on the at least one modification input, and wherein the divider display object is repositioned adjacent to at least one different executable component displayed in the third display as compared to the second display.

21. The system as recited in claim 20, wherein executable components displayed in the third display are repositioned to prevent intersection with the divider display object.

22. The system as recited in claim 20, wherein the second representation and the third representation include the same executable components from the subset of executable components.

23. The system as recited in claim 20, wherein at least one executable component in the third representation is different from the executable components in the second representation.

24. The system as recited in claim 20, wherein the at least one modification input includes user-selected movement of the divider display object on the display of the telecommunications device.

* * * * *